US009879887B2

(12) United States Patent
Takahashi et al.

(10) Patent No.: US 9,879,887 B2
(45) Date of Patent: Jan. 30, 2018

(54) EJECTOR

(71) Applicant: DENSO CORPORATION, Kariya, Aichi-pref. (JP)

(72) Inventors: Toru Takahashi, Kariya (JP); Eitaro Tanaka, Kariya (JP); Satoshi Inoue, Kariya (JP); Masatoshi Kuroyanagi, Kariya (JP); Yoichiro Kawamoto, Kariya (JP); Etsuhisa Yamada, Kariya (JP); Haruyuki Nishijima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 19 days.

(21) Appl. No.: 15/111,872

(22) PCT Filed: Dec. 16, 2014

(86) PCT No.: PCT/JP2014/006247
§ 371 (c)(1),
(2) Date: Jul. 15, 2016

(87) PCT Pub. No.: WO2015/111112
PCT Pub. Date: Jul. 30, 2015

(65) Prior Publication Data
US 2016/0348948 A1    Dec. 1, 2016

(30) Foreign Application Priority Data

Jan. 21, 2014  (JP) ................................. 2014-008562

(51) Int. Cl.
*F25B 1/10*     (2006.01)
*F04F 5/20*     (2006.01)
(Continued)

(52) U.S. Cl.
CPC .................. *F25B 1/10* (2013.01); *F04F 5/18* (2013.01); *F04F 5/20* (2013.01); *F04F 5/46* (2013.01);
(Continued)

(58) Field of Classification Search
CPC ........ F04F 5/54; F04F 5/18; F04F 5/20; F04F 5/46; F04F 5/48; F25B 1/10; F25B 41/00;
(Continued)

(56) References Cited

U.S. PATENT DOCUMENTS 4,247,262 A * 1/1981 Lipstein ................. G21C 15/25
165/108
5,343,711 A    9/1994 Kornhauser et al.
(Continued)

FOREIGN PATENT DOCUMENTS

JP          3322263 B1    9/2002
JP          3331604 B2    10/2002
(Continued)

*Primary Examiner* — Emmanuel Duke
(74) *Attorney, Agent, or Firm* — Harness, Dickey & Pierce, P.L.C.

(57) ABSTRACT

An ejector has a swirling space, a pressure reducing space, a suction passage, a pressure increasing space, a nozzle passage, a diffuser passage, a passage forming member that forms the nozzle passage and the diffuser passage, and a vibration suppressing portion that suppresses a vibration of the passage forming member. The vibration suppressing portion has (i) a first elastic member that applies a load to the passage forming member in a direction in which an area of a cross section perpendicular to the direction of the central axis of the nozzle passage and the diffuser passage decreases and (ii) a second elastic member that applies a load to the passage forming member in a direction opposite from the direction in which the first elastic member applies the load to the passage forming member.

6 Claims, 10 Drawing Sheets

(51) Int. Cl.

| | |
|---|---|
| *F04F 5/46* | (2006.01) |
| *F04F 5/48* | (2006.01) |
| *F25B 40/02* | (2006.01) |
| *F25B 41/00* | (2006.01) |
| *F25B 41/06* | (2006.01) |
| *F04F 5/18* | (2006.01) |
| *F04F 5/54* | (2006.01) |
| *F25B 27/00* | (2006.01) |
| *B60H 1/32* | (2006.01) |

(52) U.S. Cl.
CPC ............... *F04F 5/48* (2013.01); *F04F 5/54* (2013.01); *F25B 40/02* (2013.01); *F25B 41/00* (2013.01); *F25B 41/062* (2013.01); *B60H 2001/3298* (2013.01); *F25B 27/00* (2013.01); *F25B 2327/001* (2013.01); *F25B 2341/0012* (2013.01); *F25B 2400/23* (2013.01); *F25B 2500/18* (2013.01)

(58) Field of Classification Search
CPC ........ F25B 41/062; F25B 40/02; F25B 27/00; F25B 2500/18; F25B 2341/0012; F25B 2400/23; F25B 2327/001; B60H 2001/3298
See application file for complete search history.

(56) References Cited

U.S. PATENT DOCUMENTS

| | | | |
|---|---|---|---|
| 2001/0025499 A1 | 10/2001 | Takeuchi et al. | |
| 2002/0184903 A1 | 12/2002 | Takeuchi et al. | |
| 2008/0314074 A1* | 12/2008 | Nakamura | F25B 41/00 62/500 |
| 2012/0247146 A1 | 10/2012 | Yamada et al. | |
| 2014/0020424 A1 | 1/2014 | Suzuki et al. | |
| 2015/0033790 A1 | 2/2015 | Yamada et al. | |
| 2015/0033791 A1 | 2/2015 | Yamada et al. | |

FOREIGN PATENT DOCUMENTS

| | | | | |
|---|---|---|---|---|
| JP | 2008202812 A | | 9/2008 | |
| JP | 2008232458 A | | 10/2008 | |
| JP | 2009002555 A | * | 1/2009 | ............ F25B 41/00 |
| JP | 2010210111 A | * | 9/2010 | |
| JP | 2010210111 A | | 9/2010 | |
| JP | 2012202652 A | | 10/2012 | |
| JP | 2012202653 A | | 10/2012 | |
| JP | 2013177879 A | * | 9/2013 | ............ F04F 5/462 |
| JP | 2013177879 A | | 9/2013 | |
| JP | 2013185484 A | | 9/2013 | |
| WO | WO-2015015782 A1 | | 2/2015 | |
| WO | WO-2015111113 A1 | | 7/2015 | |

* cited by examiner

EJECTOR

CROSS REFERENCE TO RELATED APPLICATIONS

This application is a U.S. National Phase Application under 35 U.S.C. 371 of International Application No. PCT/JP2014/006247 filed on Dec. 16, 2014 and published in Japanese as WO 2015/111112 A1 on Jul. 30, 2015. This application is based on and claims the benefit of priority from Japanese Patent Application No. 2014-008562 filed on Jan. 21, 2014. The entire disclosures of all of the above applications are incorporated herein by reference.

TECHNICAL FIELD

The present disclosure relates to an ejector that is a momentum transfer pump for reducing a pressure of fluid and carrying out fluid transfer by a suction action of working fluid injected at a high speed.

BACKGROUND ART

Conventionally, as an ejector for a vapor compression refrigeration cycle, an ejector disclosed in Patent Literature 1 is known, for example.

This type of ejector includes (i) a nozzle that reduces a pressure of a refrigerant, which is after being compressed to have a high pressure by a compressor and then condensed and liquefied by a condenser, (ii) a suction portion for drawing a low-pressure refrigerant flowing out of an evaporator, and (iii) a diffuser for mixing the refrigerant injected from the nozzle and the refrigerant drawn into the suction portion and increasing a pressure of a mixed refrigerant.

In Patent Literature 1, the following characteristic structure is employed to provide an ejector that can exert a high nozzle efficiency without increasing a size of a structure irrespective of load variation of the refrigeration cycle. In the ejector in Patent Literature 1, a swirling space for swirling a refrigerant flowing into the swirling space through a refrigerant inflow port, from which a refrigerant flows in, is formed between the refrigerant inflow port and a nozzle passage in a body.

With this structure, by swirling of the refrigerant in the swirling space, a pressure of the refrigerant on a center side of a swirl can be reduced to a pressure at which the refrigerant becomes a saturated liquid-phase refrigerant or a pressure at which the refrigerant boils under reduced pressure and the refrigerant at the reduced pressure can be caused to flow into the nozzle passage that functions as a nozzle. Therefore, irrespective of the load variation of the refrigeration cycle, the refrigerant can be caused to boil under reduced pressure near a portion of the nozzle passage with the smallest passage area, which improves energy conversion efficiency (corresponding to the nozzle efficiency) in the nozzle passage.

In the ejector in Patent Literature 1, a passage forming member that forms the nozzle passage and a diffuser passage is disposed in a pressure reducing space and a pressure increasing space formed in the body and the passage forming member has a shape with a sectional area increasing as a distance from the pressure reducing space increases.

By employing the passage forming member in this shape, the diffuser passage can be formed in a shape diverging along an outer periphery of the passage forming member as a distance from the pressure reducing space increases. As a result, an axial dimension of the passage forming member can be prevented from increasing, and a size of the structure of the ejector can be prevented from increasing.

The ejector in Patent Literature 1 further includes a drive part for displacing the passage forming member. In Patent Literature 1, the drive part is configured by (i) a pressure responsive member that displaces the passage forming member according to a temperature and a pressure of the refrigerant flowing out of an evaporator and (ii) an elastic member that applies a load to push the passage forming member toward a side in a direction in which a sectional area of the refrigerant passage of the nozzle passage and the diffuser passage decreases.

By employing such a drive part, the passage forming member is displaced according to the load variation of the refrigeration cycle to adjust the passage areas of the nozzle passage and the diffuser passage, with which operation of the ejector appropriate to the load of the refrigeration cycle is achieved. The passage forming member is displaced to such a side as to increase the passage areas of the nozzle passage and the diffuser passage when a force from the pressure responsive member exceeds the load (i.e., biasing force) applied by the elastic member.

PRIOR ART LITERATURES

Patent Literature

Patent Literature 1: JP 2013-177879 A

SUMMARY OF INVENTION

According to the study by the inventors of the present application, the ejector in Patent Literature 1 receives vibrations from the outside when the ejector is applied to a refrigeration cycle of an air conditioner for a vehicle and therefore a natural frequency of the passage forming member needs to be set to a relatively high value in order to avoid resonance with the vibrations. Irrespective of whether the ejector is applied to the refrigeration cycle of the air conditioner for the vehicle, the passage forming member of the ejector vibrates due to pressure pulsation of the refrigerant and therefore the natural frequency of the passage forming member is preferably set to the relatively high value in order to avoid resonance with such vibrations.

On the other hand, in the ejector in Patent Literature 1, the passage forming member has the shape with the sectional area increasing toward a downstream side in a flow direction of refrigerant in order to reduce the size of the structure. Accordingly, the size (i.e., weight) of the passage forming member increases as compared with a normal flow control valve or the like. Therefore, in order to set the natural frequency of the passage forming member to the high value, a spring constant of the elastic member used for the drive part needs to be set to a high value.

However, the load for pushing the passage forming member in a direction in which the passage areas of the nozzle passage and the diffuser passage decrease becomes excessively large when the spring constant of the elastic member of the passage forming member is set to the high value.

Therefore, the force from the pressure responsive member does not exceed the load applied by the elastic member in increasing the passage areas of the nozzle passage and the diffuser passage, incurring a situation in which the drive part cannot displace the passage forming member to a desired position. This situation means that the operation of the ejector appropriate to the load of the refrigeration cycle cannot be obtained and is not preferable.

As described above, the ejector in Patent Literature 1 suffers from a problem in which the operation of the ejector appropriate to the load of the refrigeration cycle cannot be achieved when the spring constant of the elastic member is set to the relatively high value in order to secure vibration control performance against the vibrations from the outside and the pressure pulsation.

In view of the above circumstances, an object of the present disclosure is to provide an ejector capable of being operated appropriately depending on a load of a refrigeration cycle while vibration control performance is secured.

The ejector of the present disclosure is applied to a vapor compression refrigerant cycle.

An ejector according to a first aspect of the present disclosure has a body, a swirling space, a pressure reducing space, a suction passage, a pressure increasing space, a nozzle passage, a diffuser passage, a passage forming member, and a drive part. The swirling space is formed in the body to swirl a refrigerant flowing into the swirling space through a refrigerant inflow port from which the refrigerant flows in. The pressure reducing space is formed in the body to reduce a pressure of the refrigerant flowing out of the swirling space. The suction passage is formed in the body and communicates with a downstream side of the pressure reducing space in a flow direction of the refrigerant. The suction passage draws the refrigerant from outside. The pressure increasing space is formed in the body to mix an injection refrigerant injected from the pressure reducing space and a suction refrigerant drawn from the suction passage. The pressure increasing space increases a pressure of a mixed refrigerant. The nozzle passage has an annular shape. At least a part of the nozzle portion is disposed inside the pressure reducing space and inside the pressure increasing space. The nozzle passage reduces the pressure of a refrigerant flowing out of the swirling space and injects the refrigerant to a space provided with an inner peripheral surface of a portion of the body forming the pressure reducing space. The diffuser passage is provided with an inner peripheral surface of a portion of the body forming the pressure increasing space and has an annular shape. The diffuser passage mixes the injection refrigerant and the suction refrigerant and increases a pressure of the mixed refrigerant. The passage forming member forms the nozzle passage and the diffuser passage. The drive part displaces the passage forming member in a direction of a central axis of the nozzle passage and the diffuser passage.

The passage forming member has a solid revolution shape having the central axis as an axis thereof and has an outer peripheral diameter increasing from the pressure reducing space toward the pressure increasing space. The drive part has (i) a pressure responsive member that displaces the passage forming member depending on a temperature and the pressure of the suction refrigerant and (ii) a vibration suppressing portion that suppresses a vibration of the passage forming member. The vibration suppressing portion has (i) a first elastic member that applies a load to the passage forming member in a direction in which an area of a cross section perpendicular to the direction of the central axis of the nozzle passage and the diffuser passage decreases and (ii) a second elastic member that applies a load to the passage forming member in a direction opposite from the direction in which the first elastic member applies the load to the passage forming member.

In this way, a spring constant of the vibration suppressing portion is the sum of a spring constant of the first elastic member and a spring constant of the second elastic member and therefore a natural frequency of the passage forming member can be set to a high value without setting the spring constant of the first elastic member to a relatively high value.

On the other hand, the load applied to the passage forming member by the vibration suppressing portion is a difference between the load applied by the first elastic member to the passage forming member and the load applied by the second elastic member to the passage forming member. In other words, the load applied to the passage forming member by the vibration suppressing portion can be made smaller than the load applied to the passage forming member by the first elastic member.

In this way, the ejector in the present disclosure has such a structure that the load required to displace the passage forming member can be small, even when the natural frequency of the passage forming member is set to the high value. Therefore, an operation of the ejector appropriate to the load of the refrigeration cycle can be achieved by adjustment of the amount of displacement of the passage forming member caused by the drive part while the vibration control performance in the ejector is secured.

The ejector according to the aspect of the present disclosure further includes a restricting member that restricts the displacement of the passage forming member caused by the drive part in a direction of the central axis of the nozzle passage. The restricting member has (i) a sliding shaft portion that extends in the direction of the central axis of the nozzle passage and is connected to the passage forming member and (ii) a guide portion that is provided with a sliding hole in which the sliding shaft portion slides in the direction of the central axis of the nozzle passage.

In this way, the ejector capable of suppressing deterioration of accuracy of an operation of the passage forming member by the drive part can be achieved while deterioration of ejector efficiency caused by decreasing coaxiality between the passage forming member and the nozzle passage with each other is suppressed.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number, and descriptions of the part may be omitted. When only a part of a configuration is described in an embodiment, another preceding embodiment may be applied to the other parts of the configuration.

First Embodiment

Figure 1:
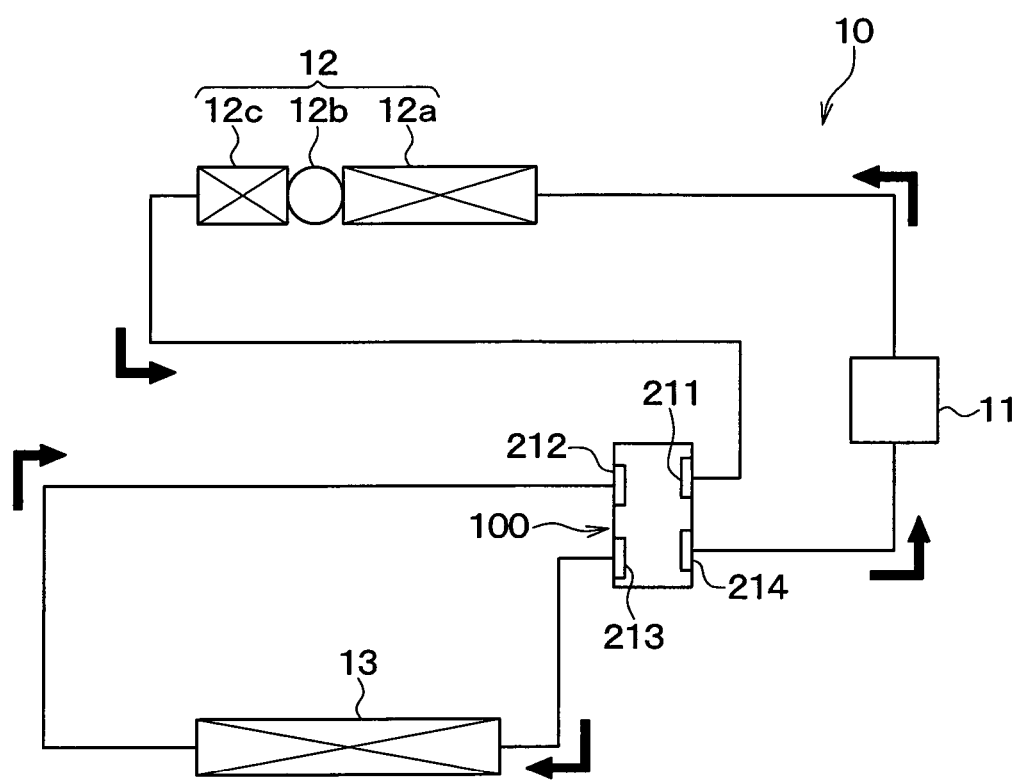
FIG. 1 is a schematic block diagram showing a general structure of a refrigeration cycle according to a first embodiment.

In the first embodiment, an ejector 100 of the present disclosure is applied to a vapor compression refrigeration cycle 10 that forms an air conditioner for a vehicle. As shown in FIG. 1, the refrigeration cycle 10 of the present embodiment is provided with a compressor 11, a condenser 12, the ejector 100, and an evaporator 13 connected to one another via refrigerant piping.

The compressor 11 is a fluid machine for drawing in a refrigerant and compressing and discharging the suction refrigerant. The compressor 11 of the present embodiment is driven for rotation by an engine for traveling of the vehicle via an electromagnetic clutch and a belt (not shown). The compressor 11 is a variable capacity compressor with a discharge capacity changed by input of a control signal from a controller (not shown) to an electromagnetic capacity control valve. The compressor 11 may be an electric compressor to be driven for rotation by an electric motor. In the case of the electric compressor, a discharge capacity is changed by a rotation speed of the electric motor.

The condenser 12 condenses and liquefies the high-pressure refrigerant discharged from the compressor 11 by exchanging heat between the high-pressure refrigerant and air outside a vehicle interior (i.e., outside air) forcibly blown by a cooling fan (not shown) to thereby release the heat of the high-pressure refrigerant to the outside air.

According to the present embodiment, a so-called subcool condenser is employed. In other words, the condenser 12 of the present embodiment has a condensing portion 12a, a receiver 12b, and a supercooling portion 12c. The condensing portion 12a condenses the high-pressure refrigerant by the heat exchange with the outside air. The receiver 12b separates gas and liquid of the refrigerant flowing out of the condensing portion 12a from each other and stores a surplus liquid-phase refrigerant. The supercooling portion 12c supercools the liquid-phase refrigerant flowing out of the receiver 12b by the heat exchange with the outside air. The refrigerant is not condensed and liquefied in the condenser 12, and therefore the condenser 12 functions as a heat radiator for releasing the heat of the high-pressure refrigerant to the outside air, when a pressure of the refrigerant compressed by the compressor 11 is higher than a critical pressure. A refrigerant outflow side of the condenser 12 is connected to a refrigerant inflow port 211 of the ejector 100.

The ejector 100 forms a pressure reducer for reducing the pressure of the liquid-phase high-pressure refrigerant flowing out of the condenser 12. The ejector 100 further forms a refrigerant circulating portion for fluid transfer, which circulates the refrigerant by a suction action (i.e., engulfing action) of the refrigerant flow injected at a high speed. A specific structure of the ejector 100 will be described later.

The evaporator 13 is a heat exchanger for absorbing heat from the outside air introduced into an air conditioning case of the air conditioner by a blower (not shown) or air in the vehicle interior (i.e., inside air) to evaporate the refrigerant flowing through the evaporator 13. A refrigerant outflow side of the evaporator 13 is connected to a refrigerant suction port 212 of the ejector 100.

The controller (not shown) is configured by a known microcomputer including a CPU, various memories, and the like and peripheral circuits. Various operation signals by an occupant from an operation panel, detection signals from a group of various sensors, and the like are input to the controller. The controller performs various operations and processing based on control programs stored in the memory by using the input signals to control an operation of various devices.

In the refrigeration cycle 10 of the present embodiment, an HFC refrigerant (e.g., R134a) is employed as the refrigerant to form a subcritical refrigeration cycle in which a refrigeration pressure on a high-pressure side does not exceed the critical pressure of the refrigerant. An HFO refrigerant (e.g., R1234yf) or the like may be employed when the refrigerant configures the subcritical refrigeration cycle.

Figure 2:
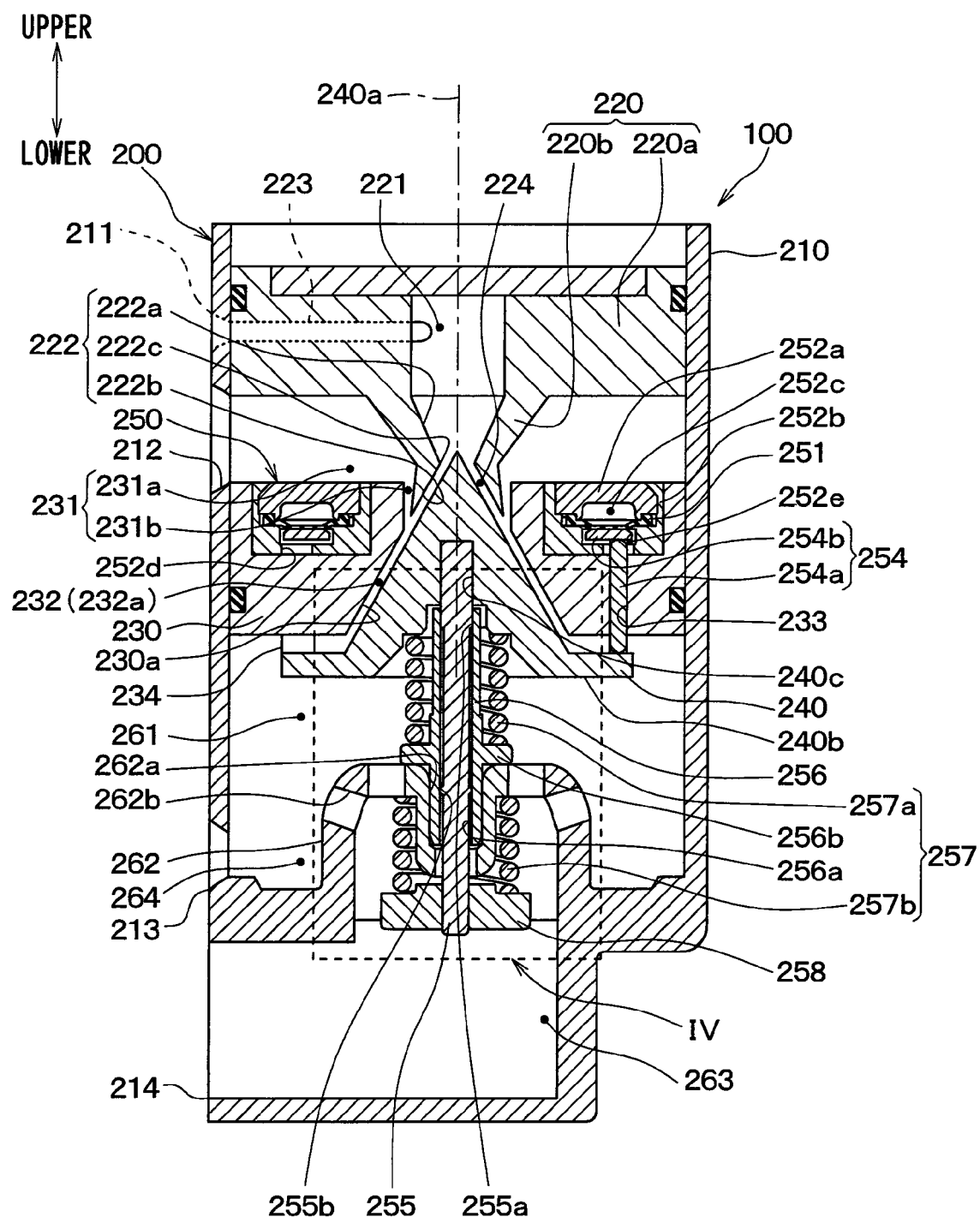
FIG. 2 is an axial sectional view of an ejector according to the first embodiment.

Next, referring to FIGS. 2 to 4, the specific structure of the ejector 100 of the present embodiment will be described. Upward and downward arrows in FIG. 2 show upward and downward directions in a state in which the ejector 100 is mounted in the vehicle. A one-dot chain line in FIG. 2 shows an axis 240a of a passage forming member 240 that will be described later.

As shown in FIG. 2, the ejector 100 of the present embodiment includes a body 200, the passage forming member 240, and a drive part 250 that displaces the passage forming member 240.

The body 200 is configured by combining constituent members. In other words, the body 200 has a metal housing body 210 formed in a hollow shape, and a nozzle body 220, a diffuser body 230, and the like are fixed inside the body 200. The housing body 210 may be made of resin or the like for weight reduction.

The housing body 210 is a member that forms an outer shell of the ejector 100. The housing body 210 has the refrigerant inflow port 211 and the refrigerant suction port 212 at an upper portion and a liquid phase outflow port 213 and a gas phase outflow port 214 at a lower portion. The refrigerant inflow port 211 is an inflow port through which the high-pressure refrigerant flows in from the high-pressure side (i.e., from the condenser 12) of the refrigeration cycle 10. The refrigerant suction port 212 is a suction port through which the low-pressure refrigerant flowing out of the evaporator 13 is drawn in. The liquid phase outflow port 213 is an outflow port through which the liquid-phase refrigerant separated in a gas-liquid separating space 261 (to be described later) flows out to a refrigerant inlet side of the evaporator 13. The gas phase outflow port 214 is an outflow port through which a gas-phase refrigerant separated in the gas-liquid separating space 261 flows out to a suction side of the compressor 11.

The nozzle body 220 is housed on an upper side in the housing body 210 so that a portion of the nozzle body 220 overlaps the refrigerant inflow port 211 of the housing body 210. The nozzle body 220 is fixed in the housing body 210 by a method such as press-fitting with a seal member such as an O-ring interposed between the nozzle body 220 and the housing body 210.

The nozzle body 220 of the present embodiment is configured by an annular metal member. The nozzle body 220 has a trunk portion 220a of a size suited to an internal space of the housing body 210, a cylindrical nozzle portion 220b disposed on a lower end of the trunk portion 220a to protrude downward, and the like.

The trunk portion 220a of the nozzle body 220 has a swirling space 221 in the trunk portion 220a for swirling the high-pressure refrigerant flowing into the swirling space 221 through the refrigerant inflow port 211. The nozzle portion 220b of the nozzle body 220 has a pressure reducing space (i.e., a space for pressure reduction) 222 inside the nozzle portion 220b and the refrigerant swirled in the swirling space 221 passes through the pressure reducing space 222.

The swirling space 221 is a space having a shape of a rotating body with a central axis extending in a vertical direction (i.e., an upper-lower direction). The shape of the rotating body is a three-dimensional shape formed by revolving a plane figure about a straight line (i.e., a central axis) in the same plane. More specifically, according to the present embodiment, the swirling space 221 has a substantially circular columnar shape. The swirling space 221 may be formed in a shape formed by connecting a cone or a truncated cone and a circular column.

According to the present embodiment, the swirling space 221 communicates with the refrigerant inflow port 211 via a refrigerant inflow passage 223 formed in the trunk portion 220a of the nozzle body 220. The refrigerant inflow passage 223 extends in a direction of a tangent to an inner wall surface of the swirling space 221 when seen in a direction of the central axis of the swirling space 221. In this way, the refrigerant flowing from the refrigerant inflow passage 223 into the swirling space 221 flows along the inner wall surface of the swirling space 221 and swirls in the swirling space 221. The refrigerant inflow passage 223 does not need to be completely aligned with the direction of the tangent to the swirling space 221 when seen in the direction of the central axis of the swirling space 221. In other words, the refrigerant inflow passage 223 may include components in other directions (e.g., the direction of the central axis of the swirling space 221) when the refrigerant inflow passage 223 has a shape with which the refrigerant flowing into the swirling space 221 flows along the inner wall surface of the swirling space 221.

Since a centrifugal force acts on the refrigerant swirling in the swirling space 221, a refrigerant pressure becomes lower on a central axis side than on an outer peripheral side in the swirling space 221. Therefore, according to the present embodiment, the refrigerant pressure on the central axis side in the swirling space 221 is reduced to a pressure at which the refrigerant becomes a saturated liquid-phase refrigerant or a pressure at which the refrigerant boils under reduced pressure when the refrigeration cycle 10 is operated. The pressure at which the refrigerant boils under reduced pressure refers to the pressure at which cavitation occurs.

Adjustment of the refrigerant pressure on the central axis side of the swirling space 221 can be achieved by adjusting a swirling flow velocity of the refrigerant swirling in the swirling space 221. Specifically, the swirling flow velocity can be adjusted by adjusting a ratio between a passage sectional area of the refrigerant inflow passage 223 and an area of a section of the swirling space 221 in a direction perpendicular to the central axis. The above-described swirling flow velocity refers to a flow velocity in a swirling direction of the refrigerant near an outermost peripheral portion in the swirling space 221.

The pressure reducing space 222 is positioned on a lower side of the swirling space 221 so that the refrigerant swirled in the swirling space 221 flows into the pressure reducing space 222. According to the present embodiment, the pressure reducing space 222 shares the common central axis to be coaxially with the swirling space 221.

The pressure reducing space 222 has a shape formed by connecting a convergent portion 222a and a divergent portion 222b. The convergent portion 222a is a space (i.e., a hole) having a truncated cone shape with a flow path sectional area continuously reducing downward (i.e., downstream in the refrigerant flowing direction). The divergent portion 222b is a space (i.e., a hole) having a truncated cone shape with a flow path sectional area continuously increasing downward. A connection portion between the convergent portion 222a and the divergent portion 222b of the pressure reducing space 222 is a nozzle throat portion (i.e., a smallest passage area portion) 222c with the smallest flow path sectional area.

The pressure reducing space 222 overlaps an upper portion of the passage forming member 240 (that will be described later) when seen in the direction orthogonal to the central axis of the pressure reducing space 222. Between the pressure reducing space 222 and the passage forming member 240, a space having an annular (i.e., a doughnut-shaped) section perpendicular to the central axis is formed.

According to the present embodiment, the refrigerant passage, which is provided between an inner peripheral surface of a portion of the nozzle body 220 forming the pressure reducing space 222 and an outer peripheral surface of the upper portion of the passage forming member 240, configures a nozzle passage 224 functioning as a nozzle, due to the shape of the passage.

The diffuser body 230 is housed in the housing body 210. The diffuser body 230 is positioned on a lower side of the trunk portion 220a of the nozzle body 220 and away from the trunk portion 220a.

Specifically, the diffuser body 230 is housed in the housing body 210 so that a portion of the diffuser body 230 overlaps the nozzle portion 220b when seen in a direction orthogonal to an axial direction (i.e., the upper-lower direction) of the housing body 210. The diffuser body 230 is fixed in the housing body 210 by a method such as press-fitting.

According to the present embodiment, the diffuser body 230 is configured by an annular metal member having a through hole 230a formed to pass through a central portion of the member from a front face to a back face. In other words, the through hole 230a passes through the diffuser body 230 from an upper face to a lower face. The nozzle portion 220b of the nozzle body 220 is positioned in the through hole 230a of the diffuser body 230. The through hole 230a shares the common central axis to be coaxially with the swirling space 221 and the pressure reducing space 222.

Between the diffuser body 230 and the nozzle body 220, a first communicating path 231a through which the refrigerant suction port 212 and the through hole 230a communicate with each other is formed. The first communicating path 231a is a passage for leading the refrigerant drawn in through the refrigerant suction port 212 toward the through hole 230a.

In an area of the through hole 230a of the diffuser body 230 into which the nozzle portion 220b of the nozzle body 220 is inserted, the refrigerant passage sectional area gradually reduces in the refrigerant flowing direction. The area of the through hole 230a into which the nozzle portion 220b is inserted is an area where the diffuser body 230 and the nozzle portion 220b overlap each other when the through hole 230a is seen in a radial direction.

Between an inner peripheral surface of the through hole 230a and an outer peripheral surface of the nozzle portion 220b, a second communicating path 231b through which the first communicating path 231a and a downstream side of the refrigerant flow of the pressure reducing space 222 communicate with each other is formed. According to the present embodiment, the first communicating path 231a and the second communicating path 231b form a suction passage (i.e., a passage for suction) 231 through which the suction refrigerant flows from an outer peripheral side toward an inner peripheral side of the central axis.

In an area of the through hole 230a of the diffuser body 230 on a downstream side of the refrigerant flow of the second communicating path 231b, a pressure increasing space (i.e., a space for pressure increase) 232 having a substantially truncated cone shape gradually diverging in the refrigerant flowing direction is formed. The pressure increasing space 232 is a space in which the injection refrigerant injected from the nozzle passage 224 and the suction refrigerant drawn in through the suction passage 231 described above are mixed and increased in pressure.

According to the present embodiment, the pressure increasing space 232 has a radial sectional area increasing toward a downstream side (i.e., downward) in the refrigerant flowing direction. The pressure increasing space 232 forms a space in a truncated cone shape (i.e., a trumpet shape) with a sectional area increasing downward.

Inside the pressure increasing space 232, a lower portion of the passage forming member 240 (that will be described later) is positioned. A diverging angle of a conical side face of the passage forming member 240 in the pressure increasing space 232 is smaller than a diverging angle of the space in the truncated cone shape of the pressure increasing space 232. In this way, the refrigerant passage area of the refrigerant passage formed between an inner peripheral surface of the pressure increasing space 232 and an outer peripheral surface of the passage forming member 240 (that will be described later) gradually increases toward a downstream side of the refrigerant flowing direction.

According to the present embodiment, the refrigerant passage formed between the inner peripheral surface of the pressure increasing space 232 and the outer peripheral surface of the passage forming member 240 is used as a diffuser passage 232a. The diffuser passage 232a functions as a diffuser that converts velocity energy of the injection refrigerant and the suction refrigerant into pressure energy. A cross section of the diffuser passage 232a perpendicular to the central axis has an annular shape.

According to the present embodiment, a fixed vane 234 that applies a swirling force for the gas-liquid separation to the refrigerant flowing out of the diffuser passage 232a is disposed on a downstream side of the refrigerant flow of the diffuser passage 232a in a portion of the diffuser body 230. The fixed vane 234 is disposed at such a position as not to interfere with an actuating rod 254a (that will be described later).

The passage forming member 240 is a metal member that forms (i) the nozzle passage 224 between the inner peripheral surface of the nozzle body 220 and the passage forming member 240 and (ii) the diffuser passage 232a between the inner peripheral surface of the diffuser body 230 and the passage forming member 240. The passage forming member 240 is housed in the housing body 210 so that a portion of the passage forming member 240 is positioned in both of the pressure reducing space 222 and the pressure increasing space 232.

According to the present embodiment, the passage forming member 240 has a solid revolution shape having the central axis of the pressure reducing space 222 and the pressure increasing space 232 as an axis 240a and has an outer peripheral diameter increasing from the pressure reducing space 222 toward the pressure increasing space 232. The passage forming member 240 may be configured by a metal member having a conical shape.

A portion of the passage forming member 240 facing an inner peripheral surface of the pressure reducing space 222 has a curved surface along the inner peripheral surface of the divergent portion 222b of the pressure reducing space 222 so as to form the nozzle passage 224 having an annular shape between the inner peripheral surface of the pressure reducing space 222 and the portion of the passage forming member 240.

A portion of the passage forming member 240 facing the inner peripheral surface of the pressure increasing space 232 has a curved surface along the inner peripheral surface of the pressure increasing space 232 so as to form the diffuser passage 232a, which is provided with the inner peripheral surface of the pressure increasing space 232 and has an annular shape, between the inner peripheral surface of the pressure increasing space 232 and the portion of the passage forming member 240.

As described above, the pressure increasing space 232 forms the space having the truncated cone shape and the passage forming member 240 has the curved surface along the inner peripheral surface of the pressure increasing space 232. Therefore, the diffuser passage 232a diverges in a direction intersecting an axial direction (i.e., a direction in which the axis 240a extends) of the passage forming member 240. In other words, the diffuser passage 232a is the refrigerant passage extending away from the axis 240a of the passage forming member 240 from the upstream side toward the downstream side of the refrigerant flow.

Next, the drive part 250 will be described. The drive part 250 displaces the passage forming member 240 in the direction of the central axis of the nozzle passage 224 and the diffuser passage 232a, in other words, in the axial direction of the passage forming member 240. According to the present embodiment, the drive part 250 controls an amount of displacement of the passage forming member 240 so that a superheat degree (i.e., a temperature and a pressure) of the low-pressure refrigerant flowing out of the evaporator 13 falls into a desired range. The drive part 250 of the present embodiment is housed in the body 200 so as not to be affected by a temperature of an outside atmosphere.

Specifically, the drive part 250 has (i) a diaphragm 251 that is a pressure responsive member and (ii) housing members 252a, 252b that form a housing space for housing the diaphragm 251.

Figure 3:
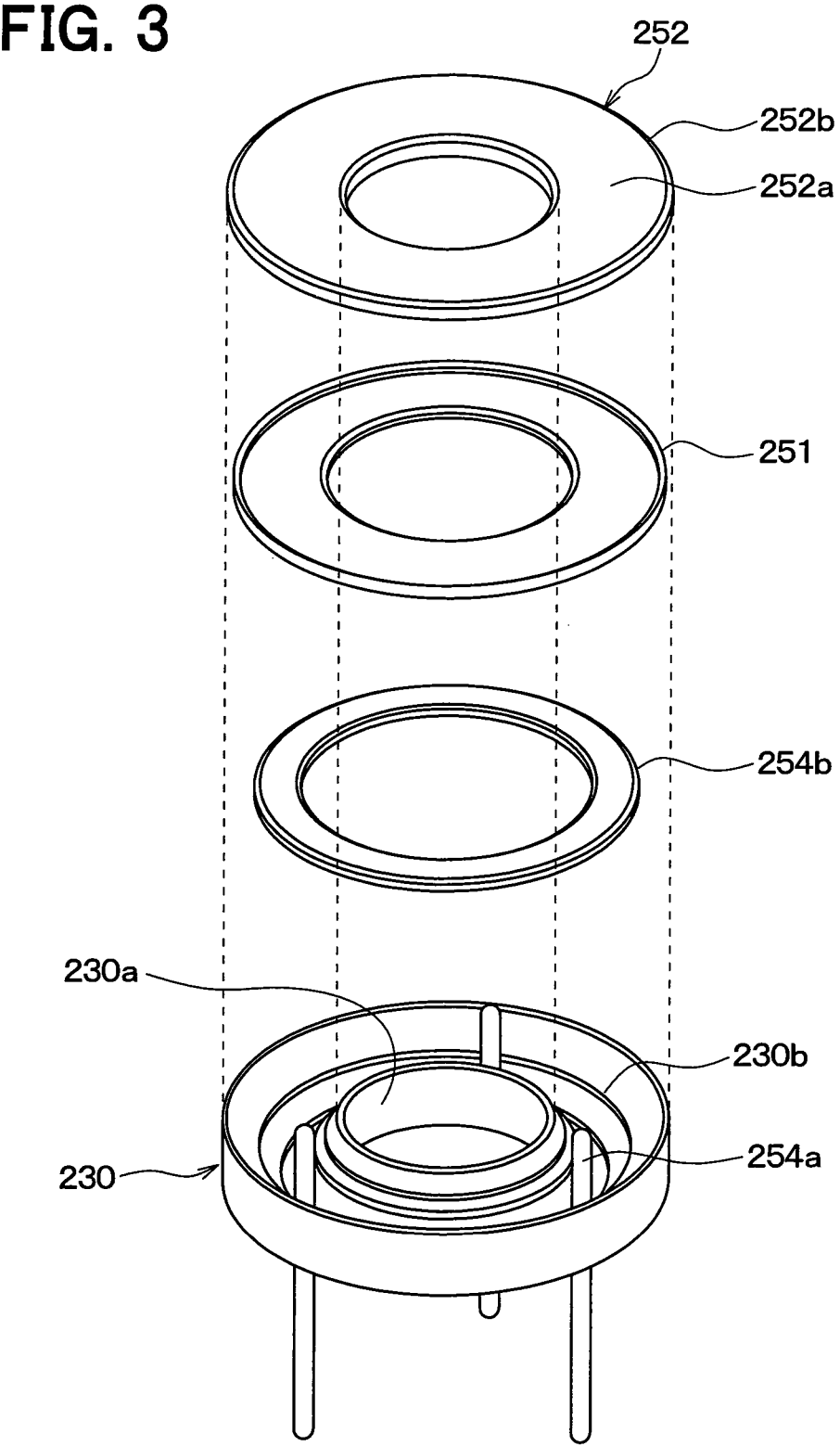
FIG. 3 is an exploded perspective view of a portion of a drive part according to the first embodiment.

The housing members 252a, 252b are provided by an upper lid portion 252a and a lower lid portion 252b formed in annular shapes shown in FIG. 3 so that the housing members 252a, 252b can be disposed in a groove in an upper face of the diffuser body 230 formed in an annular shape.

The diaphragm 251 is formed in an annular shape so as to divide an annular housing space, which is provided by each of the lid portions 252a, 252b, into two spaces of an upper space and a lower space. The diaphragm 251 is fixed by crimping or the like with an outer peripheral edge portion and an inner peripheral edge portion respectively pinched by each of the lid portions 252a, 252b.

Referring to FIG. 2 again, the upper space out of the two spaces separated by the diaphragm 251 forms an encapsulating space 252c in which a temperature sensitive medium with a pressure changing according to change in the temperature of the refrigerant flowing out of the evaporator 13 is encapsulated. In the encapsulating space 252c, the temperature sensitive medium (e.g., R134a) mainly configured by the same refrigerant as the refrigerant circulating through the refrigeration cycle 10 is encapsulated so as to have a predetermined density. As the temperature sensitive medium, a mixture of the refrigerant circulating through the cycle and helium gas may be employed, for example.

The upper lid portion 252a forming the encapsulating space 252c together with the diaphragm 251 is positioned in the groove formed in the upper face of the diffuser body 230 so that the first communicating path 231a of the suction passage 231 is formed between the upper lid portion 252a and the trunk portion 220a. In this way, a temperature of the suction refrigerant is transferred to the temperature sensitive medium in the encapsulating space 252c and an internal pressure of the encapsulating space 252c becomes a pressure according to the temperature of the suction refrigerant.

On the other hand, the lower space out of the two spaces separated by the diaphragm 251 forms an introducing space 252e into which the suction refrigerant is introduced through a communicating hole 252d formed in the lower lid portion 252b. The introducing space 252e is a pressure chamber for applying a pressure of the suction refrigerant to the diaphragm 251 so as to resist a pressure of the temperature sensitive medium. The communicating hole 252d in the lower lid portion 252b communicates with the first communicating path 231a of the suction passage 231 via a refrigerant introducing path (not shown).

Therefore, the temperature of the refrigerant flowing out of the evaporator 13, that is, the suction refrigerant flowing through the suction passage 231 is transferred to the temperature sensitive medium encapsulated in the encapsulating space 252c via the upper lid portion 252a and the diaphragm 251. According to the present embodiment, the encapsulating space 252c configures a temperature sensing portion for sensing the temperature of the suction refrigerant flowing through the suction passage 231.

The diaphragm 251 is deformed according to a pressure difference between the internal pressure of the encapsulating space 252c and a pressure of the refrigerant introduced into the introducing space 252e and is always in contact with the refrigerant. Therefore, airtightness, resistance to the pressure of the refrigerant, and the like of the encapsulating space 252c need to be secured.

Therefore, the diaphragm 251 is preferably made of material excellent in toughness, pressure resistance, a gas barrier property, and sealability. The diaphragm 251 can be configured by a substrate including base fabric (i.e., polyester) and made of rubber such as ethylene-propylene rubber (i.e., EPDM) and hydrogenated nitrile rubber (i.e., HNBR), for example.

The drive part 250 has a transmitting member 254 for transmitting displacement of the diaphragm 251 to the passage forming member 240. The transmitting member 254 of the present embodiment is configured by the actuating rod 254a and a plate member 254b. The actuating rod 254a is disposed such that a lower end portion of the actuating rod 254a is in contact with the passage forming member 240 and has a circular columnar shape. According to the present embodiment, more than or equal to two of the actuating rods 254a are disposed. The plate member 254b is disposed to be in contact with both the diaphragm 251 and an upper end portion of each actuating rod 254a.

The actuating rods 254a are disposed to be able to slide in guide holes 233 formed in the diffuser body 230 so that one end sides of the actuating rods 254a are in contact with an outer periphery of the lower portion of the passage forming member 240 and that the other end sides are in contact with the plate member 254b. The guide holes 233 are formed in the diffuser body 230 so as to extend in the axial direction of the passage forming member 240 and connect the suction passage 231 and the downstream side of the diffuser passage 232a.

The three or more actuating rods 254a are preferably disposed at intervals in a circumferential direction of the diffuser body 230 so that the displacement of the diaphragm 251 is accurately transmitted to the passage forming member 240. More preferably, the three actuating rods 254a are disposed at intervals in the circumferential direction of the diffuser body 230.

This point is described. In the structure in which the three actuating rods 254a are disposed, the respective actuating rods 254a come in contact with the plate member 254b to contribute to stabilization of a posture of the plate member 254b, even when the respective actuating rods 254a vary in length. As a result, as compared with a structure in which four or more actuating rods 254a are disposed, flow resistance of the refrigerant drawn in from the suction passage 231 can be suppressed while the posture of the plate member 254b is stabilized. Furthermore, clearances between the actuating rods 254a and the guide holes 233 can serve as detour paths for allowing the suction refrigerant to flow out to the downstream side of the diffuser passage 232a while detouring around the diffuser passage 232a. Therefore, by disposing the three actuating rods 254a, the suction refrigerant can be appropriately introduced into the diffuser passage 232a by suppression of leakage of the refrigerant.

When the actuating rods 254a are fixed by welding or the like to the passage forming member 240 and the plate member 254b, axes of the actuating rods 254a incline with respect to the axis 240a of the passage forming member 240 due to a warp of the diaphragm 251, variation in pressure of the temperature sensitive medium, or the like. The passage forming member 240 may be displaced irrespective of the superheat degree (i.e., the temperature and the pressure) of the suction refrigerant when the axes of the actuating rods 254a incline with respect to the axis 240a of the passage forming member 240.

Therefore, according to the present embodiment, positions and angles of contact of both of portions of the actuating rods 254a to be in contact with the plate member 254b and portions of the actuating rods 254a to be in contact with the passage forming member 240 with respect to the plate member 254b and the passage forming member 240 can be changed. In other words, both of the positions of contact between the actuating rods 254a and the plate member 254b and the positions of contact between the actuating rods 254a and the passage forming member 240 can be changed. Furthermore, both of the angles of contact between the actuating rods 254a and the plate member 254b and the angles of contact between the actuating rods 254a and the passage forming member 240 can be changed. Specifically, both of the portions of the actuating rods 254a to be in contact with the plate member 254b and the portions of the actuating rods 254a to be in contact with the passage forming member 240 has a curved surface shape (i.e., hemispherical shape according to the present embodiment).

In this way, the inclination of the axes of the actuating rods 254a with respect to the axial direction of the passage forming member 240 due to the warp of the diaphragm 251, the variation in pressure of the temperature sensitive medium, or the like can be suppressed. The shapes of the portions of the actuating rods 254a to be in contact with the plate member 254b and the portions of the actuating rods 254a to be in contact with the passage forming member 240 are not limited to the hemispherical shapes but may be curved surface shapes such as rounded shapes. Alternatively, only one of the portions of each of the actuating rods 254a to be in contact with the plate member 254b and the passage forming member 240 may be formed so that the position and the angle of contact can be changed.

The plate member 254b is a member for connecting the diaphragm 251 and the actuating rods 254a and adjacent to the diaphragm 251 so as to support an intermediate portion of the diaphragm 251 between an outer peripheral edge portion and an inner peripheral edge portion. The plate member 254b of the present embodiment supports a face of the diaphragm 251 on a side of the introducing space 252e.

As shown in FIG. 3, according to the present embodiment, the plate member 254b is formed in an annular shape so as to overlap the diaphragm 251 when seen in the axial direction of the passage forming member 240 in order to appropriately transmit the displacement of the diaphragm 251 to the actuating rods 254a.

Referring to FIG. 2, according to the present embodiment, the plate member 254b is made of a metal material so as to have higher rigidity than the diaphragm 251. By providing the plate member 254b between the diaphragm 251 and the actuating rods 254a, change of a force transmitted from the diaphragm 251 to the passage forming member 240 due to variations in dimensions of the respective actuating rods 254a, the warp of the diaphragm 251, or the like can be suppressed. Especially, the plate member 254b can also function as a barrier that suppresses leakage of the temperature sensitive medium from the diaphragm 251, when the diaphragm 251 is configured by the rubber substrate.

The drive part 250 also includes restricting members 255, 256 and a vibration suppressing portion 257. The restricting members 255, 256 restrict the displacement of the passage forming member 240 into the direction of the central axis of the nozzle passage 224 and the diffuser passage 232a. The vibration suppressing portion 257 suppresses vibrations of the passage forming member 240.

The restricting members 255, 256 are configured by (i) a sliding shaft portion 255 that extends in the direction of the central axis of the nozzle passage 224 and the diffuser passage 232a and (ii) a guide portion 256 that has a sliding hole 256a through which the sliding shaft portion 255 slides.

The sliding shaft portion 255 has one end portion connected to a back face 240b of the passage forming member 240 and extends from the back face 240b of the passage forming member 240 toward a lower side of the housing body 210. The sliding shaft portion 255 is not limited to be configured by the rod-shaped member, and may be configured by a cylindrical member, for example.

Specifically, an upper end portion of the sliding shaft portion 255 is fixed by press-fitting or the like into a bottomed hole 240c formed in a central portion of the back face 240b of the passage forming member 240. "The back face 240b of the passage forming member 240" is a bottom surface not facing the pressure reducing space 222 nor the pressure increasing space 232.

According to the present embodiment, the sliding shaft portion 255 is provided at a sliding portion facing the sliding hole 256a with paired protruding portions 255a, 255b protruding toward the sliding hole 256a. The protruding portion 255a is positioned on one end side (i.e., an upper side) in an axial direction of the sliding portion of the sliding shaft portion 255 facing the sliding hole 256a. The protruding portion 255b is positioned on the other end side (i.e., a lower side) in the axial direction of the sliding portion of the sliding shaft portion 255 facing the sliding hole 256a.

In this way, the sliding shaft portion 255 comes in contact with the sliding hole 256a at two positions on the opposite end sides of the sliding portion of the sliding shaft portion 255. Therefore, sufficiently long arm of moment can be obtained when the moment for inclining the axis 240a acts on the passage forming member 240.

On the other hand, the guide portion 256 is a member for supporting an intermediate portion of the sliding shaft portion 255 between the one end portion and the other end portion for sliding with the sliding hole 256a extending in the direction of the central axis of the nozzle passage 224 and the diffuser passage 232a. The guide portion 256 is connected to a portion of the housing body 210 on a lower side of the passage forming member 240 (i.e., on a downstream side of the refrigerant flow in the diffuser passage 232a). Specifically, the guide portion 256 is fixed by press-fitting or the like into a through hole 262a of a cylindrical portion 262 formed at a central portion of the housing body 210 on a lower side of the passage forming member 240.

The vibration suppressing portion 257 is a member that suppresses influences of vibrations caused by external factors and vibrations caused by internal factors on the displacement of the passage forming member 240. The vibrations caused by the external factors are vibrations caused when vehicle-mounted devices are operated or the vehicle travels, for example. The vibrations caused by the internal factors are vibrations caused by pulsation of the refrigerant in the ejector 100, for example. According to the present embodiment, the vibration suppressing portion 257 is configured by first and second elastic members 257a, 257b that apply a load to the passage forming member 240.

The first elastic member 257a applies the load to the passage forming member 240 in a direction (i.e., upward) in which sectional areas of the nozzle passage 224 and the diffuser passage 232a perpendicular to the direction of the central axis decrease. The first elastic member 257a is configured by a coil spring.

Specifically, the first elastic member 257a is disposed in a compressed state between the back face of the passage forming member 240 and an upper face side (i.e., a flange portion 256b of the guide portion 256) of the cylindrical portion 262 of the housing body 210 so as to apply the upward load to the passage forming member 240.

On the other hand, the second elastic member 257b is disposed in a compressed state between a lower face side of the cylindrical portion 262 and a load adjusting member 258 connected to the other end portion of the sliding shaft portion 255 so as to apply the load in an opposite direction (i.e., a downward direction) from the direction of the load from the first elastic member 257a to the passage forming member 240. Since spring constants of the coil springs are unstable at the beginning of bending, the coil springs need to be disposed in the states in which the coil springs are bent (i.e., compressed) to some extent.

Spring constant k of the vibration suppressing portion 257 is the sum of spring constant k1 of the first elastic member 257a and spring constant k2 of the second elastic member 257b (k=k1+k2). In other words, the spring constant k of the vibration suppressing portion 257 is greater than the spring constant k1 of the first elastic member 257a by the spring constant k2 of the second elastic member 257b (k>k1).

In other words, according to the vibration suppressing portion 257 of the present embodiment, a natural frequency of the passage forming member 240 can be set to a higher value than in the conventional technique in which the vibration suppressing portion 257 is formed only of the first elastic member 257a. The spring constant k of the vibration suppressing portion 257 is set so that the natural frequency of the passage forming member 240 is in such a high frequency domain as to be able to suppress resonance with the vibrations of the vehicle-mounted devices or the like.

On the other hand, load F applied by the vibration suppressing portion 257 to the passage forming member 240 is a difference between load F1 applied by the first elastic member 257a and load F2 applied by the second elastic member 257b (F=|F1−F2|). In other words, according to the vibration suppressing portion 257 of the present embodiment, the load F applied to the passage forming member 240 can be reduced as compared with that in the conventional technique in which the vibration suppressing portion 257 is formed only of the first elastic member 257a.

According to the present embodiment, the sliding shaft portion 255 is connected to the passage forming member 240 to which the load is applied by the first elastic member 257a and is connected to the load adjusting member 258 to which the load is applied by the second elastic member 257b.

Therefore, the loads from both of the elastic members 257a and 257b are applied to the sliding shaft portion 255. At this time, the sliding shaft portion 255 may incline with respect to the central axis of the nozzle passage 224 and the diffuser passage 232a when the loads of the respective elastic members 257a, 257b act in directions to compress the sliding shaft portion 255. The sliding shaft portion 255 comes in contact with the sliding hole 256a, and a frictional force at the sliding portion of the sliding shaft portion 255 increases, when the sliding shaft portion 255 inclines. Accordingly, accuracy of an operation of the passage forming member 240 by the drive part 250 deteriorates.

Figure 4:
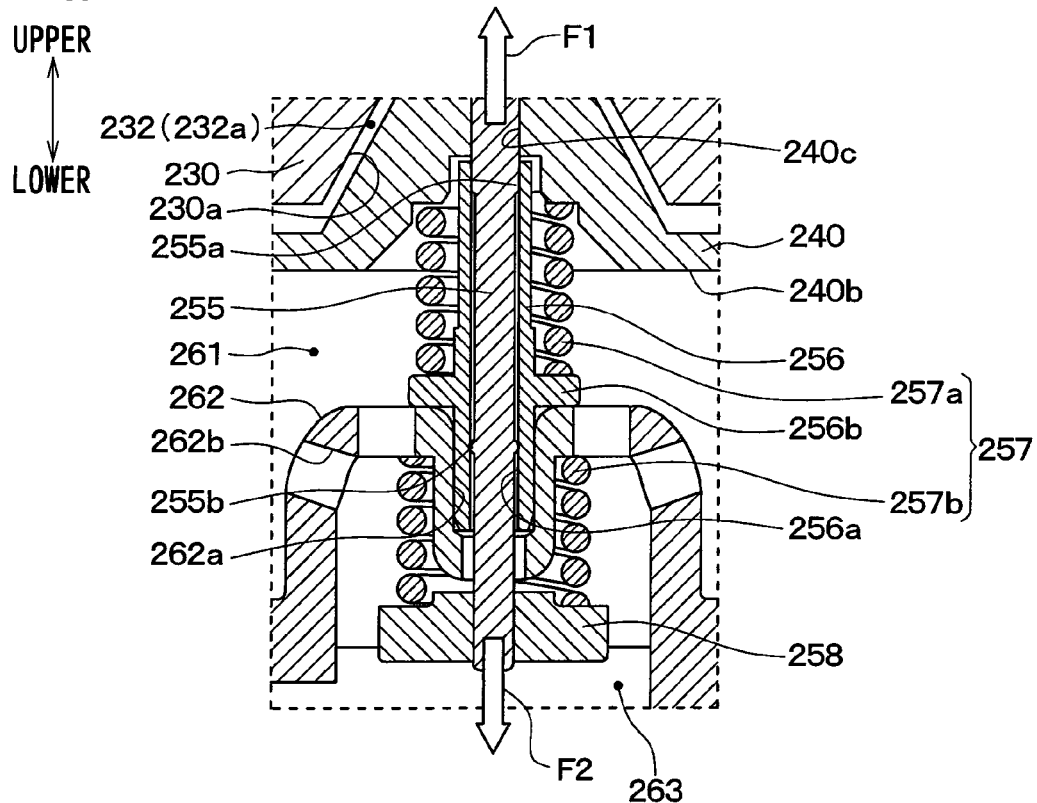
FIG. 4 is an axial sectional view of portion IV in FIG. 2.

On the other hand, according to the vibration suppressing portion 257 of the present embodiment, the load F1 of the first elastic member 257a acts to pull the sliding shaft portion 255 upward and the load F2 of the second elastic member 257b acts to pull the sliding shaft portion 255 downward as shown in FIG. 4. In other words, the vibration suppressing portion 257 of the present embodiment is formed so that the loads of the respective elastic members 257a, 257b act in directions to pull the sliding shaft portion 255 against each other. Therefore, according to the vibration suppressing portion 257 of the present embodiment, the inclination of the sliding shaft portion 255 with respect to the central axis can be suppressed as compared with a structure in which the loads of the respective elastic members 257a, 257b act in directions to compress the sliding shaft portion 255.

The load adjusting member 258 adjusts the loads applied by the vibration suppressing portion 257 to the passage forming member 240 to thereby adjust a valve opening pressure of the passage forming member 240 to finely adjust the superheat degree to a target degree.

The load adjusting member 258 of the present embodiment can adjust the load F2 applied to the passage forming member 240 by the second elastic member 257b. According to the present embodiment, the load adjusting member 258 is connected to a lower end portion of the sliding shaft portion 255 so that a position of the load adjusting member 258 can be moved in the direction of the central axis (i.e., the upper-lower direction). The load F2 of the second elastic member 257b increases as the load adjusting member 258 is moved upward and reduces as the load adjusting member 258 is moved downward.

The drive part 250 adjusts the superheat degree of the refrigerant on the outlet side of the evaporator 13 toward a predetermined value set in advance by displacement of the passage forming member 240 by the diaphragm 251 depending on the temperature and the pressure of the refrigerant flowing out of the evaporator 13.

Specifically, when the temperature and the pressure of the refrigerant flowing out of the evaporator 13 are high and the load of the refrigeration cycle 10 is high, a saturation pressure of the temperature sensitive medium encapsulated in the encapsulating space 252c increases and a pressure difference between the internal pressure of the encapsulating space 252c and the pressure of the introducing space 252e becomes large.

At this time, the diaphragm 251 displaces the passage forming member 240 downward so as to increase the refrigerant passage areas of the nozzle passage 224 and the diffuser passage 232a when the force from the diaphragm 251 exceeds the load applied to the vibration suppressing portion 257. In this way, a flow volume of the refrigerant circulating through the refrigeration cycle 10 increases.

On the other hand, when the temperature and the pressure of the refrigerant flowing out of the evaporator 13 are low and the load of the refrigeration cycle 10 is low, the saturation pressure of the pressure-sensitive medium encapsulated in the encapsulating space 252c reduces and the pressure difference between the internal pressure of the encapsulating space 252c and the pressure of the introducing space 252e reduces.

At this time, by a balance between the force from the diaphragm 251 and the load applied to the vibration suppressing portion 257, the diaphragm 251 displaces the passage forming member 240 upward so as to reduce the refrigerant passage areas of the nozzle passage 224 and the diffuser passage 232a. In this way, the flow volume of the refrigerant circulating through the refrigeration cycle 10 decreases.

Next, the portion of the housing body 210 on the lower side of the passage forming member 240 will be described. The gas-liquid separating space 261 that separates a mixed refrigerant, which flows out of the diffuser passage 232a, into gas and liquid is formed on a lower side of the passage forming member 240 in the housing body 210. The gas-liquid separating space 261 is a substantially circular cylindrical space. The gas-liquid separating space 261 shares the common central axis to be coaxially with the swirling space 221, the pressure reducing space 222, and the pressure increasing space 232.

The circular cylindrical portion 262 that is coaxial with the gas-liquid separating space 261 and extends toward the passage forming member 240 (i.e., upward) is provided at a bottom surface of the portion forming the gas-liquid separating space 261.

At a central portion in a radial direction of the cylindrical portion 262, the through hole 262a into which the above-described guide portion 256 is fixed is positioned. At the cylindrical portion 262, a communicating hole 262b is formed for connecting the gas-liquid separating space 261 and a gas phase side outflow passage 263 formed in the housing body 210. The gas phase refrigerant separated in the gas-liquid separating space 261 flows into the gas phase side outflow passage 263 through the communicating hole 262b and is led to the gas phase outflow port 214.

A space on an outer peripheral side of the cylindrical portion 262 in the housing body 210 forms a reservoir space 264 for storing the liquid-phase refrigerant. The liquid-phase refrigerant separated in the gas-liquid separating space 261 is stored in the reservoir space 264. At a portion of the housing body 210 corresponding to the reservoir space 264, the liquid phase outflow port 213 is formed for leading the liquid-phase refrigerant stored in the reservoir space 264 to the outside. In other words, the liquid phase outflow port 213 is formed in a wall surface of the housing body 210 forming the reservoir space 264.

An operation of the embodiment based on the above-described structure will be described hereafter. When an air conditioning operation switch or the like is turned on by an occupant, the electromagnetic clutch of the compressor 11 is energized by means of a control signal from the controller and a rotary drive force is transmitted to the compressor 11 from the engine for traveling of the vehicle via the electromagnetic clutch or the like. The control signal is input from the controller to an electromagnetic capacity control valve of the compressor 11 to adjust a discharge capacity of the compressor 11 to a desired capacity and the compressor 11 compresses the gas-phase refrigerant drawn in from the gas phase outflow port 214 of the ejector 100 and discharges the refrigerant.

The high-temperature and high-pressure gas-phase refrigerant discharged from the compressor 11 flows into the condensing portion 12a of the condenser 12 and is cooled by the outside air to thereby be condensed and liquefied, and then separated into the gas phase and the liquid phase by the receiver 12b. The liquid-phase refrigerant separated by the receiver 12b flows into the supercooling portion 12c and is supercooled.

Figure 5:
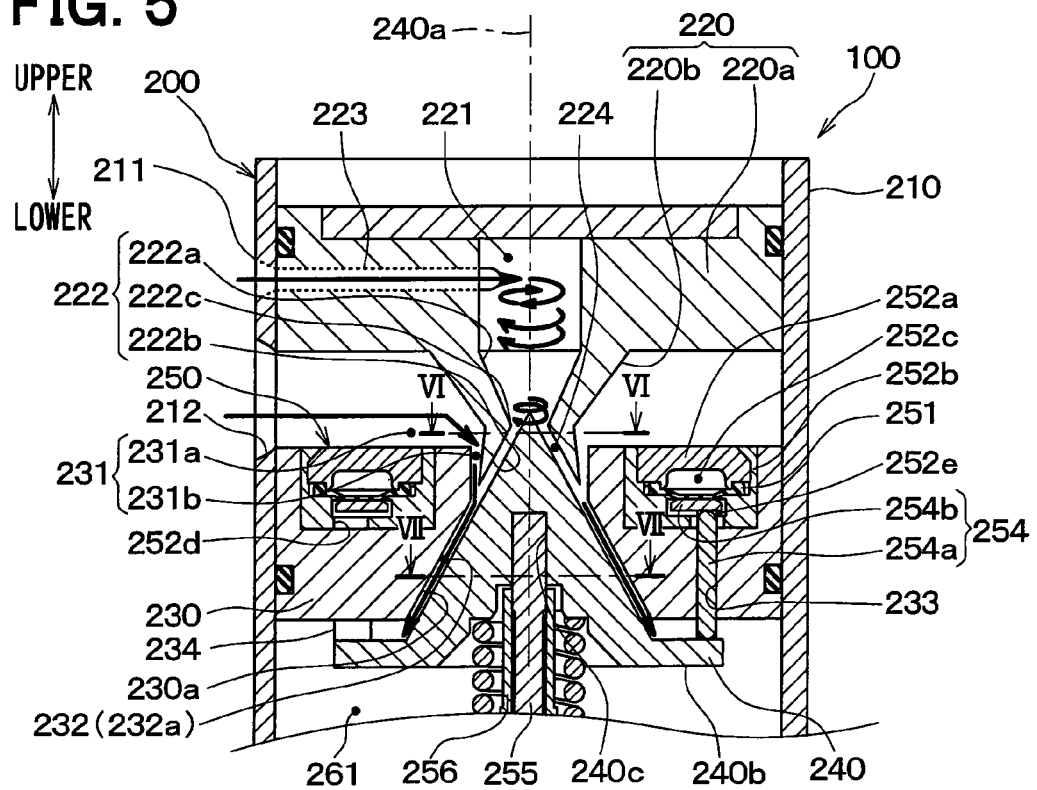
FIG. 5 is a schematic sectional view illustrating functions of respective refrigerant flow paths in the ejector according to the first embodiment.

The liquid-phase refrigerant flowing out of the supercooling portion 12c of the condenser 12 flows into the refrigerant inflow port 211 of the ejector 100. As shown in FIG. 5, the liquid-phase refrigerant flowing into the refrigerant inflow port 211 of the ejector 100 flows into the swirling space 221 in the ejector 100 via the refrigerant inflow passage 223. The high-pressure refrigerant flowing into the swirling space 221 flows along the inner wall surface of the swirling space 221 and becomes a swirling flow swirling in the swirling space 221. The swirling flow is brought into a two-layer separated state in which the gas single phase exists on the center side of the swirl and the liquid single phase exists around the gas single phase by reducing the pressure near the center of the swirl to the pressure at which the refrigerant boils under reduced pressure by the action of centrifugal force.

The gas single phase refrigerant and the liquid single phase refrigerant swirling in the swirling space 221 flow, as a gas-liquid mixed refrigerant, into the pressure reducing space 222 that shares the common central axis to be coaxially with the swirling space 221. In the nozzle passage 224, a pressure of the gas-liquid mixed refrigerant is reduced, and the gas-liquid mixed refrigerant is expanded. By conversion of the pressure energy of the refrigerant into the velocity energy at the time of the pressure reduction and the expansion, the gas-liquid mixed refrigerant is injected at high speed from the nozzle passage 224.

This point is described in detail. In the nozzle passage 224, wall surface boiling occurs when the refrigerant is separated from the inner wall surface of the convergent portion 222a of the nozzle portion 220b. Furthermore, a boiling core caused by cavitation of the refrigerant on the center side of the nozzle passage 224 causes interface boiling. The wall surface boiling and the interface boiling facilitate boiling of the refrigerant. As a result, the refrigerant flowing into the nozzle passage 224 comes into the gas-liquid mixed state in which the gas phase and the liquid phase are homogeneously mixed.

Choking occurs in the flow of the refrigerant after becoming the gas-liquid mixed state near the nozzle throat portion 222c of the nozzle portion 220b. The gas-liquid mixed refrigerant, a velocity of which has reached a sound velocity due to the choking, is accelerated in the divergent portion 222b of the nozzle portion 220b and is injected.

In this manner, by facilitation of the boiling by both the wall surface boiling and the interface boiling, the gas-liquid mixed refrigerant can be efficiently accelerated to the sound velocity, and energy conversion efficiency (corresponding to nozzle efficiency) in the nozzle passage 224 can be improved.

Figure 6:
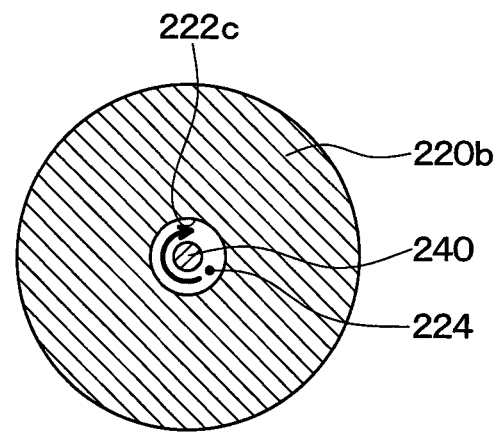
FIG. 6 is a sectional view taken along line VI-VI in FIG. 5.

Since the nozzle passage 224 of the present embodiment is formed in the substantially annular shape coaxial with the swirling space 221, the refrigerant flows while swirling around the passage forming member 240 in the nozzle passage 224 as shown by a thick solid-line arrow in FIG. 6.

Figure 7:
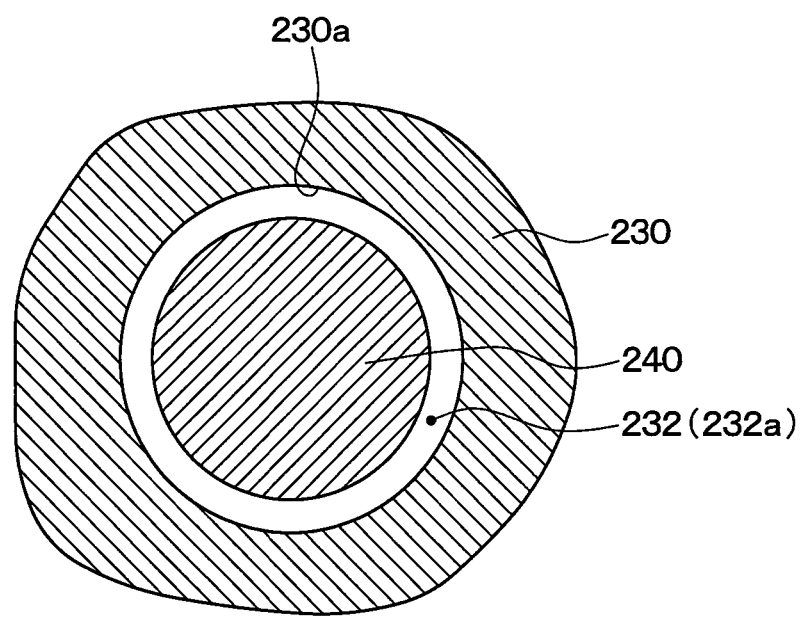
FIG. 7 is a sectional view taken along line VII-VII in FIG. 5.

The refrigerant flowing out of the evaporator 13 is drawn into the suction passage 231 through the refrigerant suction port 212 by the suction action of the refrigerant injected from the nozzle passage 224. A mixture of the low-pressure refrigerant drawn into the suction passage 231 and the injection refrigerant injected from the nozzle passage 224 flows into the diffuser passage 232a having the refrigerant flow path area increasing toward the downstream side of the refrigerant flow and the pressure is increased by conversion of the velocity energy into the pressure energy. As shown in FIG. 7, the diffuser passage 232a of the present embodiment is formed in the substantially annular shape coaxial with the nozzle passage 224.

Since the fixed vane 234 in the passage forming member 240 applies the swirling force to the refrigerant flowing out of the diffuser passage 232a, the refrigerant is separated into the gas and the liquid by the action of the centrifugal force in the gas-liquid separating space 261.

The gas-phase refrigerant separated in the gas-liquid separating space 261 is drawn into the suction side of the compressor 11 via the gas phase side outflow passage 263 and the gas phase outflow port 214 and is compressed again. At this time, since the pressure of the refrigerant drawn into the compressor 11 has been increased in the diffuser passage 232a of the ejector 100, the drive force of the compressor 11 can be reduced.

The liquid-phase refrigerant separated in the gas-liquid separating space 261 is stored in the reservoir space 264 and flows into the evaporator 13 via the liquid phase outflow port 213 by the refrigerant suction action of the ejector 100.

In the evaporator 13, the low-pressure liquid-phase refrigerant absorbs heat from air flowing in the air conditioning case and evaporates and vaporizes. The gas-phase refrigerant flowing out of the evaporator 13 is drawn into the suction passage 231 via the refrigerant suction port 212 of the ejector 100 and flows into the diffuser passage 232a.

According to the present embodiment, the ejector 100 has the swirling space 221 for swirling the high-pressure refrigerant flowing into the swirling space 221 through the refrigerant inflow port 211 and leading the refrigerant into the nozzle passage 224.

In this manner, the structure for swirling the high-pressure refrigerant in the swirling space 221 facilitates the boiling under reduced pressure of the refrigerant in the nozzle passage 224 and enables uniform mixing of the gas and the liquid of the refrigerant in the nozzle passage 224. In this way, a flow velocity of the refrigerant injected from the nozzle passage 224 can be increased, and the nozzle efficiency in the nozzle passage 224 can be improved. The nozzle efficiency in the nozzle passage 224 of the ejector 100 is improved in proportion to the velocity of the injection refrigerant.

In the ejector 100 of the present embodiment, the single nozzle passage 224 carries out the boiling of the refrigerator under reduced pressure. Therefore, all the pressure energy of the refrigerant flowing into the ejector 100 can be utilized to obtain pressure increase energy by the diffuser passage 232a.

According to the present embodiment, the passage forming member 240 has the substantially conical shape with the outer peripheral diameter increasing as a distance from the pressure reducing space 222 increases. Therefore, the diffuser passage 232a can be formed in the shape diverging toward an outer peripheral side as a distance from the pressure reducing space 222 increases. In this way, a dimension in the axial direction of the passage forming member 240 can be prevented from increasing, and a size of the structure of the entire ejector 100 can be prevented from increasing.

Moreover, in the ejector 100 of the present embodiment, the pressure increasing space 232 has the radial sectional area increasing downstream in the refrigerant flowing direction and the passage forming member 240 has the curved surface along the inner peripheral surface of the pressure increasing space 232. The section of the diffuser passage 232a orthogonal to the axial direction of the passage forming member 240 has the annular shape so that the refrigerant swirls in the same direction as the refrigerant swirling in the swirling space 221.

In this manner, the flow path for increasing the pressure of the refrigerant can be formed in a spiral shape when the flow of the refrigerant in the diffuser passage 232a is formed as a flow swirling around the central axis of the passage forming member 240. In this way, a sufficient length of the refrigerant passage for increasing the pressure of the refrigerant can be secured without increasing a dimension of the diffuser passage 232a in the axial direction of the passage forming member 240. Therefore, the dimension of the ejector 100 in the axial direction of the passage forming member 240 can be prevented from increasing. As a result, the size of the structure of the entire ejector 100 can be further prevented from increasing.

The ejector 100 of the present embodiment has the drive part 250 for displacing the passage forming member 240. Therefore, the passage forming member 240 can be displaced depending on the load of the refrigeration cycle 10 to adjust the refrigerant passage areas of the nozzle passage 224 and the diffuser passage 232a. As a result, the refrigerant of the flow volume depending on the load of the refrigeration cycle 10 can be caused to flow, and the effective operation of the ejector 100 appropriate to the load of the refrigeration cycle 10 can be exerted.

Especially, according to the present embodiment, the structure of the vibration suppressing portion 257 for suppressing the vibrations of the passage forming member 240 has the following characteristics. The vibration suppressing portion 257 has the first elastic member 257a and the second elastic member 257b. The first elastic member 257a applies the load to the passage forming member 240 in a direction to reduce the passage sectional areas of the nozzle passage 224 and the like. The second elastic member 257b applies the load to the passage forming member 240 in an opposite direction from that of the load applied by the first elastic member 257a.

As a result, the spring constant of the vibration suppressing portion 257 is the sum of the spring constant of the first elastic member 257a and the spring constant of the second elastic member 257b. Therefore, the natural frequency of the passage forming member 240 can be set to the high value without setting the spring constant of the first elastic member 257a to the relatively high value.

On the other hand, the load applied by the vibration suppressing portion 257 to the passage forming member 240 equals to the difference between the load applied by the first elastic member 257a to the passage forming member 240 and the load applied by the second elastic member 257b to the passage forming member 240. In other words, the load applied to the passage forming member 240 by the vibration suppressing portion 257 can be made smaller than the load applied to the passage forming member 240 by the first elastic member 257a.

In this manner, according to the ejector 100 of the present embodiment, the load required to displace the passage forming member 240 can be made small even when the natural frequency of the passage forming member 240 is set to the high value.

Therefore, according to the embodiment, the operation of the ejector 100 appropriate to the load of the refrigeration cycle 10 can be achieved by adjusting the amount of displacement of the passage forming member 240 caused by the drive part 250 while the vibration control performance in the ejector 100 is secured.

However, the ejector efficiency may deteriorate in a case where a coaxiality between the axis 240a of the passage forming member 240 and the central axis of the nozzle passage 224 decreases when the drive part 250 displaces the passage forming member 240.

The sectional area of the nozzle passage 224 varies in the circumferential direction when the coaxiality of the axis 240a between the passage forming member 240 and the central axis of the nozzle passage 224 decreases.

An insufficient expansion or an overexpansion occurs in the nozzle passage 224, or the refrigerant easily flow through some portions while flowing less easily through the other portions, when the sectional area of the nozzle passage 224 varies in the circumferential direction. Therefore, the refrigerant velocity at the outlet of the nozzle passage 224 is not uniform, and the efficiency (corresponding to the nozzle efficiency) of conversion of the pressure energy into the velocity energy deteriorates. As a result, the pressure of the refrigerant cannot be increased sufficiently in the diffuser passage 232a, the efficiency (i.e., ejector efficiency) of the entire ejector 100 deteriorates.

In view of the above-described points, the embodiment further includes the restricting member that restricts the displacement of the passage forming member 240 caused by the drive part 250 to the direction of the central axis of the nozzle passage 224. According to the present embodiment, the restricting member is configured by the sliding shaft portion 255 extending in the direction of the central axis of the nozzle passage 224 and connected to the passage forming member 240 and the guide portion 256 for allowing the sliding shaft portion 255 to slide in the direction of the central axis of the nozzle passage 224.

In this way, since the restricting members 255, 256 are provided for restricting the displacement of the passage forming member 240 caused by the drive part 250 in the direction of the central axis of the nozzle passage 224, the decrease of the coaxiality between the axis 240a of the passage forming member 240 and the central axis of the nozzle passage 224 can be suppressed. As a result, deterioration of the ejector efficiency caused by the decrease of the coaxiality between the axis 240a of the passage forming member 240 and the central axis of the nozzle passage 224 can be suppressed.

As a conceivable restricting member, a sliding shaft portion may be fixed to the body and a sliding hole through which the sliding shaft portion slides may be formed in the passage forming member 240.

However, in the ejector 100 of the present embodiment, the axis 240a of the passage forming member 240 is set to be short for downsizing, and therefore a depth of the sliding hole becomes small, when the sliding hole is formed in the passage forming member 240. As a result, a sufficient length of a sliding portion of the sliding shaft portion facing the sliding hole cannot be secured. Therefore, an arm length of a moment becomes short when a moment inclining the axis 240a effects on the passage forming member 240, and a large pressing force is generated between the passage forming member 240 and the sliding shaft portion. Such a pressing force is not undesirable, since the force increases the frictional force in sliding of the sliding shaft portion in the sliding hole to reduce accuracy of operation (i.e., accuracy in adjustment of the amount of displacement) of the passage forming member 240 by the drive part 250.

On the other hand, according to the present embodiment, the sliding shaft portion 255 is connected to the passage forming member 240. In this way, the length of the sliding portion of the sliding shaft portion 255 facing the sliding hole 256a is not restricted by the dimension in the axial direction of the passage forming member 240 and therefore the sufficient length of the sliding portion can be secured. Therefore, the long arm of moment can be obtained when the moment for inclining the axis 240a acts on the passage forming member 240. As a result, the deterioration of the accuracy of the operation of the passage forming member 240 by the drive part 250 can be suppressed by suppressing the frictional force in sliding of the sliding shaft portion 255 in the sliding hole 256a.

According to the present embodiment, the sufficient length of the sliding portion of the sliding shaft portion 255 facing the sliding hole 256a can be secured and therefore inclination of the sliding shaft portion 255 caused by a clearance between the sliding shaft portion 255 and the sliding hole 256a can be suppressed. As a result, the decrease of the coaxiality between the axis 240a of the passage forming member 240 and the central axis of the nozzle passage 224 can be suppressed, and the deterioration of the efficiency of the ejector 100 can be suppressed.

According to the present embodiment, the vibration suppressing portion 257 is formed so that the loads of the respective elastic members 257a and 257b act in the directions to pull the sliding shaft portion 255 against each other. In this way, inclination of the respective elastic members 257a, 257b with respect to the central axis of the nozzle passage 224 can be suppressed as compared with the structure in which the loads of the respective elastic members 257a, 257b act in the directions to compress the sliding shaft portion 255. Therefore, the contact between the sliding shaft portion 255 and the sliding hole 256a due to the inclination of the sliding shaft portion 255 can be suppressed. As a result, the frictional force and an amount of wear in the sliding hole 256a can be reduced.

The diaphragm 251 and the encapsulating space 252c of the drive part 250 are formed in an annular shape to surround the axis 240a of the passage forming member 240. In this way, a sufficient area of the diaphragm 251 for receiving the pressure of the refrigerant can be secured, and therefore the nozzle passage 224 and the diffuser passage 232a can be appropriately varied with changing the pressure of the suction refrigerant. As a result, an appropriate flow volume of the refrigerant depending on the load of the refrigeration cycle 10 can be caused to flow, and the operation of the ejector 100 appropriate to the load of the refrigeration cycle 10 can be achieved.

Furthermore, according to the present embodiment, the diaphragm 251 forming the pressure responsive member is configured by the rubber substrate having the annular shape. In this way, the amount of displacement (i.e., stroke) of the diaphragm 251 can be increased while the pressure resistance of the encapsulating space 252c against change in the internal pressure is secured.

According to the present embodiment, the portions of the actuating rods 254a to be in contact with the passage forming member 240 and the portions of the actuating rods 254a to be in contact with the plate member 254b are formed in the curved surface shapes so that the positions and the angles of contact of the portions with the respective members 240, 254b can be changed. In this way, the inclination of the axes of the actuating rods 254a with respect to the axial direction of the passage forming member 240 due to the warp or the like of the diaphragm 251 can be suppressed. Therefore, the passage forming member 240 can be displaced depending on the temperature and the pressure of the refrigerant flowing through the suction passage 231. As a result, an appropriate volume of the refrigerant can flow depending on the load of the refrigeration cycle 10, and the operation of the ejector 100 appropriate to the load of the refrigeration cycle 10 can be exerted.

Second Embodiment

The second embodiment will be described. In the second embodiment, a portion of a drive part 250 is changed from that in the first embodiment. In the following description of the present embodiment, portions similar or equivalent to those in the first embodiment will not be described or will be described briefly.

According to the present embodiment, the drive part 250 is provided by changing (i) the structures of the sliding shaft portion 255 and the guide portion 256 that are the restricting members and (ii) a disposed position of the vibration suppressing portion 257 in the first embodiment.

Figure 8:
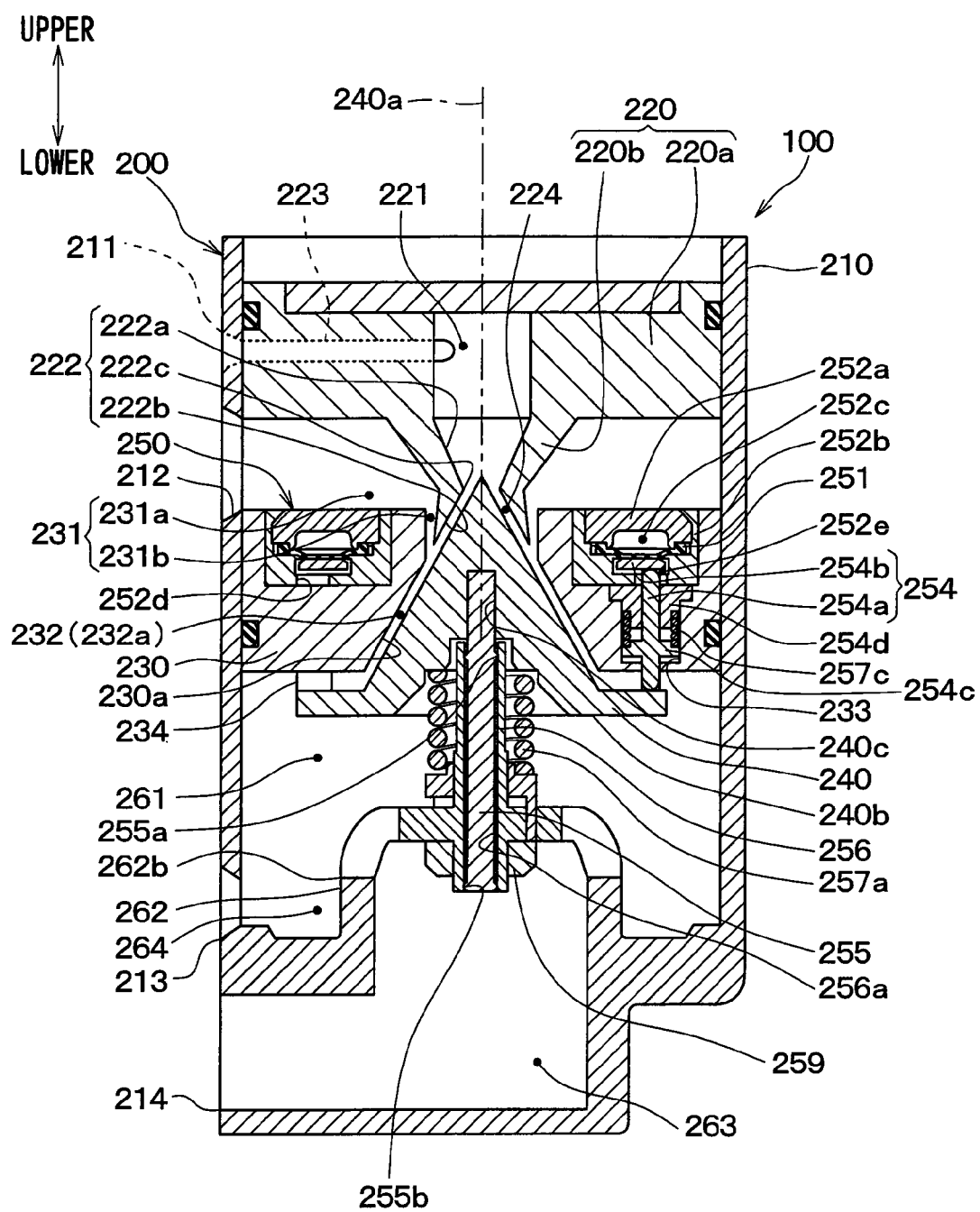
FIG. 8 is an axial sectional view of an ejector according to a second embodiment.

As shown in FIG. 8, a guide portion 256 of the present embodiment is integrated with a cylindrical portion 262 of a housing body 210. In other words, according to the present embodiment, the guide portion 256 is formed at the cylindrical portion 262 of the housing body 210.

According to the present embodiment, a first elastic member 257a is disposed in a compressed state between a back face of a passage forming member 240 and a load adjusting member 259 provided to the cylindrical portion 262 so as to apply an upward load to the passage forming member 240.

The load adjusting member 259 of the present embodiment can adjust load F1 applied to the passage forming member 240 by the first elastic member 257a. According to the present embodiment, the load adjusting member 259 is provided to a connection between the cylindrical portion 262 and the guide portion 256 so that a position of the load adjusting member 259 can be moved in a direction of a central axis (i.e., an upper-lower direction). The load F1 of the first elastic member 257a is increased by moving the load adjusting member 259 upward and is reduced by moving the load adjusting member 259 downward.

Second elastic members 257c are disposed in guide holes 233 so as to apply loads in an opposite direction (i.e., downward) from the direction of the load applied by the first elastic member 257a to the passage forming member 240 via respective actuating rods 254a. Specifically, the second elastic members 257c are disposed in compresses states between flange portions 254c provided to the respective actuating rods 254a forming transmitting members 254 and cylindrical members 254d disposed in the guide holes 233 in a diffuser body 230.

According to the present embodiment, the guide holes 233 have larger inside diameters on upper sides so as to be able to house the second elastic members 257c. The cylindrical members 254d also function as suppressing portions that suppress an inflow of a suction refrigerant from an upper side of the guide holes 233.

Other structures and operations are similar to those in the first embodiment. According to the embodiment, the following effects can be obtained in addition to the effects of the first embodiment. According to the present embodiment, the second elastic members 257c are disposed not on a lower side of the passage forming member 240 in the body 200 but in the guide holes 233 through which the actuating rods 254a slide.

In this way, the dimension of an ejector 100 in an axial direction of the passage forming member 240 can be further prevented from increase as compared to a case of having the structure of the first embodiment in which the second elastic member 257b is disposed on a lower side of the passage forming member 240 in the body 200. As a result, the structure of the entire ejector 100 can be further reduced in size than in the first embodiment.

According to the present embodiment, the sliding shaft portion 255 is configured by a cylindrical member. However, the sliding shaft portion 255 may be configured by a rod-shaped member, for example, as in the first embodiment. The same holds true for the following embodiments.

Third Embodiment

The third embodiment will be described. According to the present embodiment, a disposed position of a second elastic member 257d of a vibration suppressing portion 257 is changed from those in the first and second embodiments. In the following description of the present embodiment, portions similar or equivalent to those in the first and second embodiments will not be described or will be described briefly.

Figure 9:
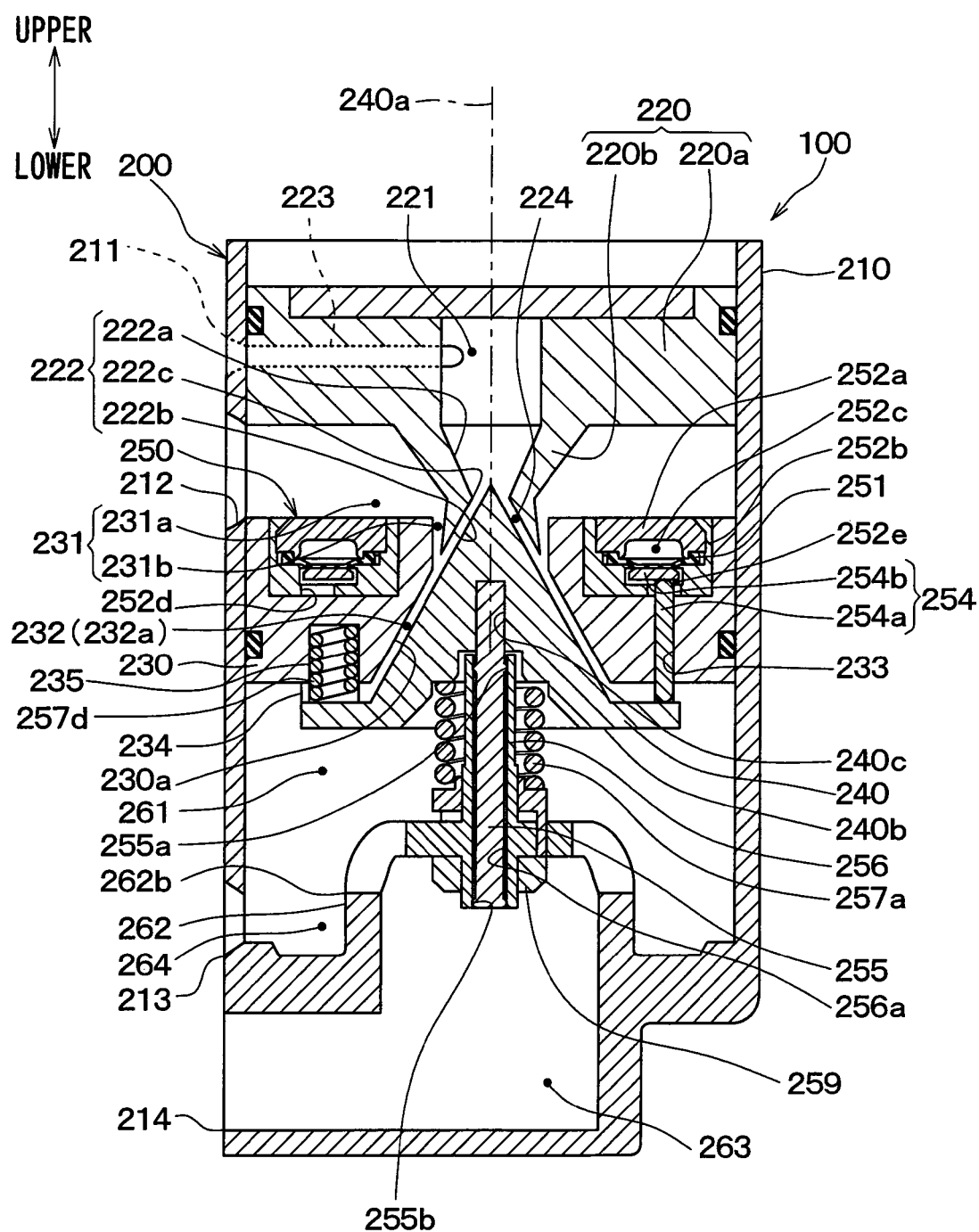
FIG. 9 is an axial sectional view of an ejector according to a third embodiment.

As shown in FIG. 9, according to the present embodiment, one or more groove portions 235 are formed in a portion of a diffuser body 230 facing a passage forming member 240 on a downstream side of a diffuser passage 232a in the flow direction of the refrigerant. In the groove portion, the second elastic member 257d is disposed.

Specifically, the second elastic member 257d is disposed in a compressed state between a bottom surface of the groove portion 235 formed in the diffuser body 230 and a portion of the passage forming member 240 facing the groove portion 235 so as to directly apply a downward load to the passage forming member 240.

Other structures and operations are similar to those in the first embodiment. According to the structure of the present embodiment, the following effects can be obtained in addition to the effects of the first embodiment. According to the present embodiment, the second elastic member 257b is disposed not on the lower side of the passage forming member 240 in the body 200 but between the groove portion 235 formed in the diffuser body 230 and the passage forming member 240.

In this way, an increase of a dimension of an ejector 100 in an axial direction of the passage forming member 240 can be suppressed as in the second embodiment, and an increase of a size in conjunction with complicating structures around actuating rods 254a can be suppressed. As a result, a size of the ejector 100 can be reduced as a whole.

Fourth Embodiment

The fourth embodiment will be described. According to the present embodiment, a disposed position of a second elastic member 257e of a vibration suppressing portion 257 is changed from those in the above-described embodiments. In the following description of the present embodiment, portions similar or equivalent to those in the above-described respective embodiments will not be described or will be described briefly.

Figure 10:
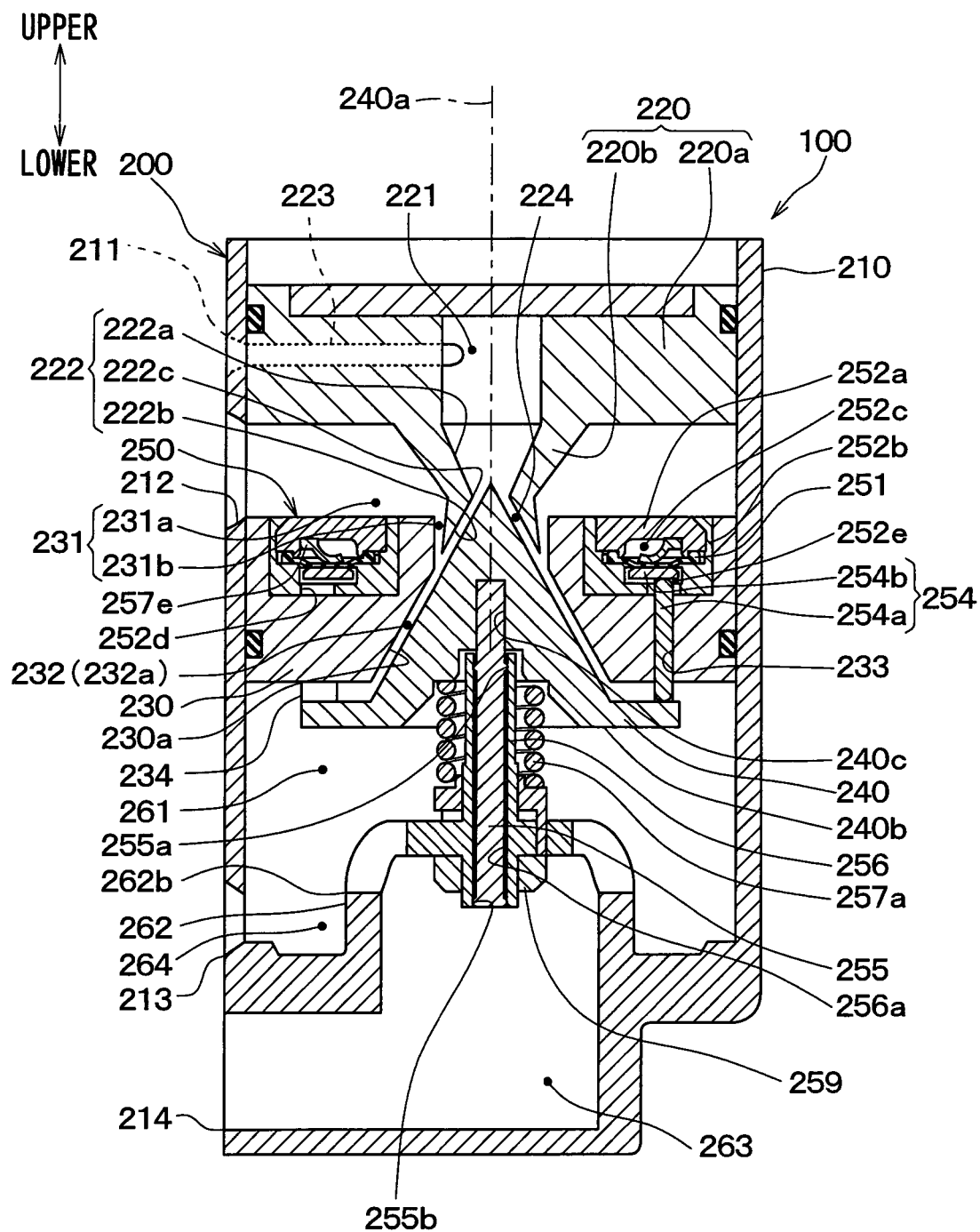
FIG. 10 is an axial sectional view of an ejector according to a fourth embodiment.

As shown in FIG. 10, according to the present embodiment, the second elastic member 257e configured by a flat spring is disposed in an encapsulating space 252c in which a temperature sensitive medium is encapsulated. Specifically, the second elastic member 257e is disposed in a compressed state between an upper lid portion 252a and a diaphragm 251 so as to apply a downward load to a passage forming member 240 via the diaphragm 251 and transmitting members 254. The second elastic member 257e may be configured by flat springs or an annular flat spring.

Other structures and operations are similar to those in the first embodiment. According to the structure of the present embodiment, the following effects can be obtained in addition to the effects of the first embodiment. According to the embodiment, the second elastic member 257e is disposed not the lower side of the passage forming member 240 in the body 200 but in the encapsulating space 252c in which the temperature sensitive medium is encapsulated.

In this way, an increase of a dimension of an ejector 100 in an axial direction of the passage forming member 240 can be suppressed as in the third embodiment, and an increase of a size of the structure in conjunction with complicating structures around actuating rods 254a can be suppressed. As a result, the structure of the entire ejector 100 can be reduced in size.

Fifth Embodiment

The fifth embodiment will be described. According to the present embodiment, a disposed position of a second elastic member 257f of a vibration suppressing portion 257 is changed from those in the above-described embodiments. In the following description of the present embodiment, portions similar or equivalent to those in the above-described respective embodiments will not be described or will be described briefly.

Figure 11:
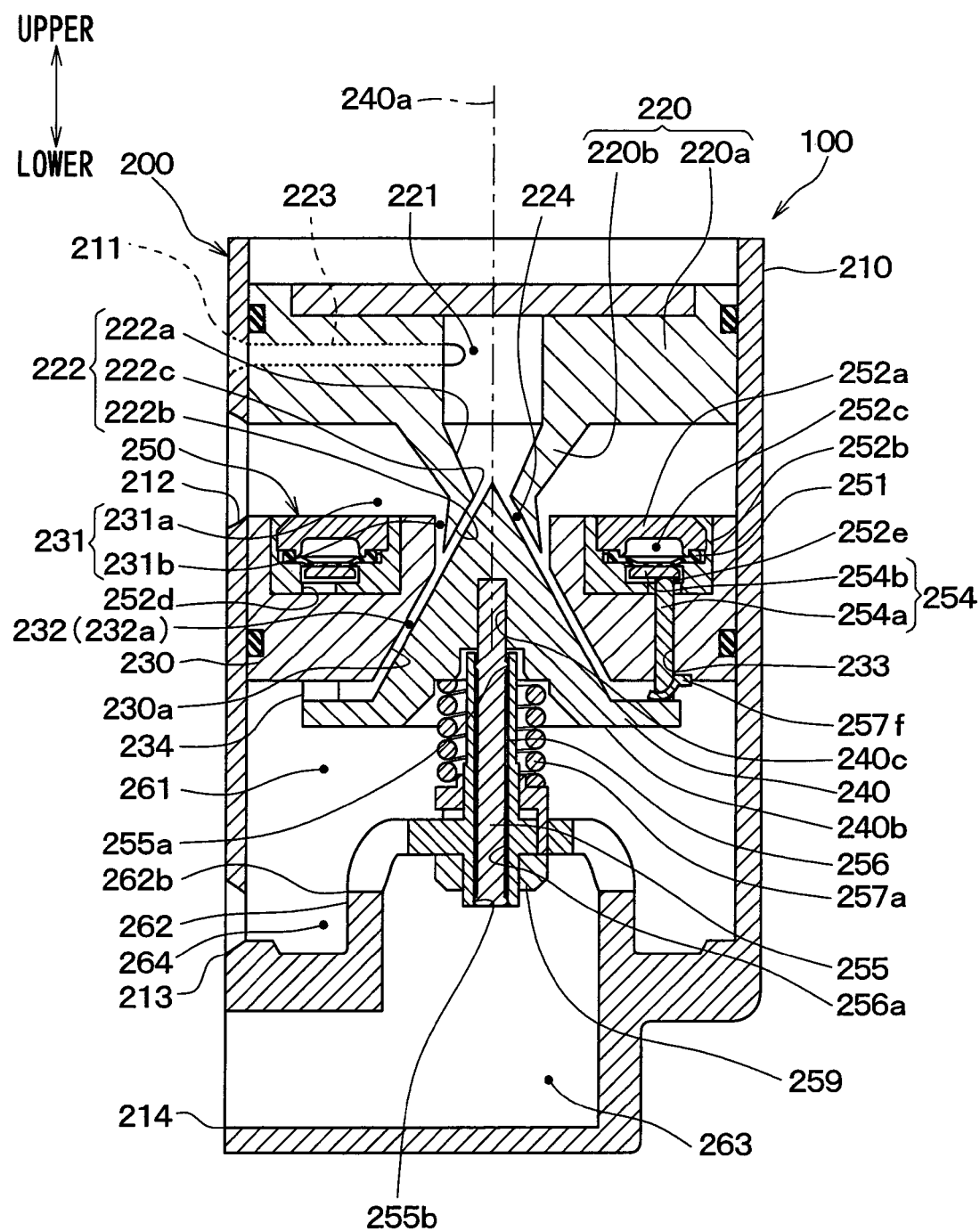
FIG. 11 is an axial sectional view of an ejector according to a fifth embodiment.

As shown in FIG. 11, according to the present embodiment, the second elastic member 257f is disposed between a diffuser body 230 and a passage forming member 240 on a downstream side of the diffuser passage 232a. Specifically, the second elastic member 257f is disposed in a compressed state between an end portion on an outer peripheral side of a lower face of the diffuser body 230 and a portion of the passage forming member 240 facing the actuating rods 254a so as to apply a downward load to the passage forming member 240. The second elastic member 257f may be configured by flat springs or an annular flat spring.

Other structures and operations are similar to those in the first embodiment. According to the present embodiment, the following effects can be obtained in addition to the effects of the first embodiment. According to the present embodiment, the second elastic member 257f is disposed not on the lower side of the passage forming member 240 in the body 200 but between the diffuser body 230 and the passage forming member 240.

In this way, an increase of a dimension of an ejector 100 in an axial direction of the passage forming member 240 can be suppressed as in the third embodiment, and an increase of a size of the structure in conjunction with complicating structures around the actuating rods 254a can be suppressed. As a result, the structure of the entire ejector 100 can be reduced in size.

Sixth Embodiment

The sixth embodiment will be described. According to the present embodiment, a disposed position of a second elastic member 257g of a vibration suppressing portion 257 is changed from those in the above-described respective embodiments. In the following description of the present embodiment, portions similar or equivalent to those in the above-described respective embodiments will not be described or will be described briefly.

Figure 12:
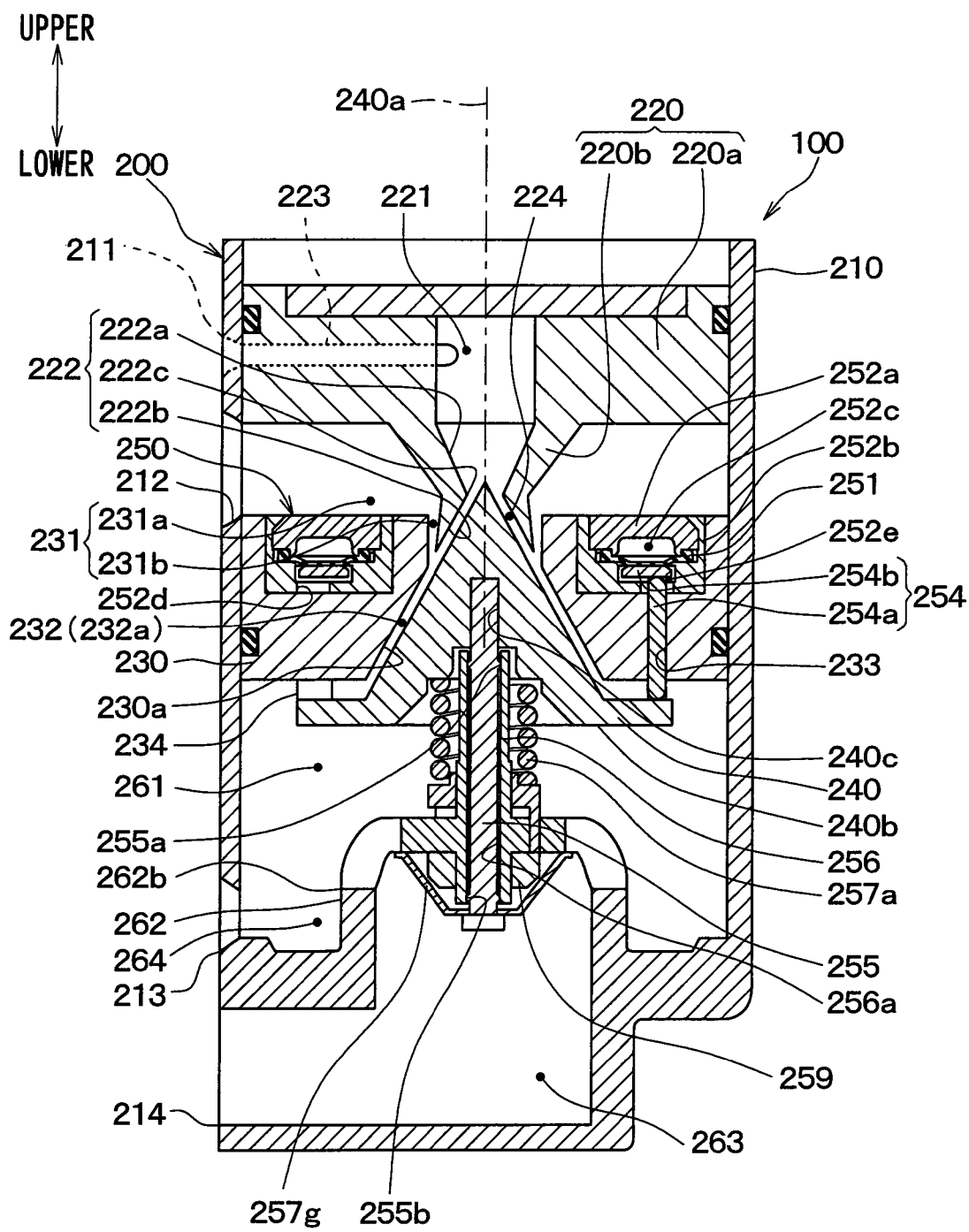
FIG. 12 is an axial sectional view of an ejector according to a sixth embodiment.

As shown in FIG. 12, according to the present embodiment, the second elastic member 257g configured by a flat spring is disposed between a lower end portion of a sliding shaft portion 255 and a cylindrical portion 262 of a housing body 210. Specifically, the second elastic member 257g is disposed in a compressed state between the lower end portion of the sliding shaft portion 255 and the cylindrical portion 262 so as to apply a downward load to a passage forming member 240 via the sliding shaft portion 255.

Other structures and operations are similar to those in the first embodiment. According to the embodiment, the following effects can be obtained in addition to the effects of the first embodiment. According to the present embodiment, the second elastic member 257g is configured by the flat spring and is disposed on the lower side of the passage forming member 240 in the body 200.

In this way, a dimension of an ejector 100 in an axial direction of the passage forming member 240 can be further prevented from increasing as compared to the structure of the first embodiment in which the second elastic member 257b configured by the coil spring is disposed on the lower side of the passage forming member 240 in the body 200. Furthermore, the structure of the entire ejector 100 can be reduced in size, since an increase of a size of the structure in conjunction with complicating structures around actuating rods 254a can be suppressed.

Other Modifications

The present disclosure is not limited to the above-described embodiments and can be modified within the scope of the present disclosure. For example, the present disclosure can be changed variously as follows.

(1) According to the above-described embodiments, the passage forming member 240 having an axial section in a shape of an isosceles triangle is employed. However, the passage forming member 240 having an axial section with two sides adjacent to an apex protruding inward or outward or a semicircular axial section may be employed, for example.

(2) As in the above-described embodiments, the diaphragm 251, each of the lid portions 252a, 252b, and the plate member 254b are preferably formed in the annular shapes in order to suppress the increase of the size of the ejector 100. However, the diaphragm 251, each of the lid portions 252a, 252b, and the plate member 254b may be respectively configured by members obtained by splitting an annular member in a circumferential direction, for example.

(3) As in the above-described embodiments, the actuating rods 254a forming the transmitting members 254 are disposed in order to appropriately transmit the displacement of the diaphragm 251 to the passage forming member 240. However, a single actuating rod 254a may be used to appropriately transmit displacement of the diaphragm 251 to the passage forming member 240.

(4) According to the above-described embodiments, the diaphragm 251 is configured by the rubber substrate. However, the diaphragm 251 may be made of stainless steel or the like, for example. The pressure responsive member is not limited to the diaphragm 251. The pressure responsive member may be configured by a movable portion such as a piston that is displaced depending on an internal pressure of the encapsulating space 252c, for example.

(5) As in the above-described embodiments, the load adjusting members 258, 259 are preferably added to the drive part 250. However, the load adjusting members 258, 259 are not essential and may be omitted.

(6) As in the above-described embodiments, the restricting members (i.e., the sliding shaft portion 255, the guide portion 256) that restrict the displacement of the passage forming member 240 into the direction of the central axis of the nozzle passage 224 are preferably provided. However, the restricting members are not essential and may be omitted.

(7) As in the above-described embodiments, the gas-liquid separating space 261 and the reservoir space 264 are preferably formed inside the ejector 100. However, the gas-liquid separator, the reservoir, and the like may be provided outside an ejector 100.

(8) In the above-described embodiments, the swirling space 221 is formed in the nozzle body 220. However, the swirling space 221 may be formed in the housing body 210.

(9) In the above-described embodiments, almost all of the components forming the body 200, the passage forming member 240, the drive part 250, and the like are configured by metal members. However, the respective constituent elements may be configured by members made of a material other than metal (e.g., resin), if such members do not have problems in pressure resistance, heat resistance, and the like.

(10) In the above-described embodiments, the subcool condenser is used as the condenser 12. However, a condenser not provided with the receiver 12b and the super-cooling portion 12c may be employed, for example.

(11) In the above-described embodiments, the ejector 100 in the present disclosure is applied to the refrigeration cycle 10 of the air conditioner for the vehicle. However, the ejector 100 in the disclosure may be applied to a heat pump cycle used for a stationary air conditioner and the like, for example.

(12) In the above-described embodiments, it is to be understood that elements constituting the embodiments are not necessary except for a case of being explicitly specified to be necessary and a case of being considered to be absolutely necessary in principle.

(13) Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle.

(14) Even when a feature such as a material forming a member, a shape of a member, or a positional relation of members, it is to be understood that such feature is not limited to a specific material, shape, positional relation, or the like except for a case of being explicitly specified to be necessary and a case of being considered to be absolutely necessary in principle.

(15) Elements that are described in the above-described embodiments can be combined with each other as required within a possible range in principle.

What is claimed is:

1. An ejector for a vapor compression refrigeration cycle, the ejector comprising:
   a body;
   a swirling space that is formed in the body to swirl a refrigerant flowing into the swirling space through a refrigerant inflow port from which the refrigerant flows in;
   a pressure reducing space that is formed in the body to reduce a pressure of the refrigerant flowing out of the swirling space;
   a suction passage that is formed in the body and communicates with a downstream side of the pressure reducing space in a flow direction of the refrigerant, the suction passage that draws the refrigerant from outside;
   a pressure increasing space that is formed in the body to mix an injection refrigerant injected from the pressure reducing space and a suction refrigerant drawn from the suction passage, the pressure increasing space that increases a pressure of a mixed refrigerant;
   a nozzle passage that has an annular shape, the nozzle portion at least a part of which is disposed inside the pressure reducing space and inside the pressure increasing space, the nozzle passage that reduces the pressure of a refrigerant flowing out of the swirling space and injects the refrigerant to a space provided with an inner peripheral surface of a portion of the body forming the pressure reducing space;
   a diffuser passage that is provided with an inner peripheral surface of a portion of the body forming the pressure increasing space and has an annular shape, the diffuser passage that mixes the injection refrigerant and the suction refrigerant and increases a pressure of the mixed refrigerant;
   a passage forming member that forms the nozzle passage and the diffuser passage; and
   a drive part that displaces the passage forming member in a direction of a central axis of the nozzle passage and the diffuser passage, wherein
   the passage forming member has a solid revolution shape having the central axis as an axis thereof and has an outer peripheral diameter increasing from the pressure reducing space toward the pressure increasing space,
   the drive part has:
     a pressure responsive member that displaces the passage forming member depending on a temperature and the pressure of the suction refrigerant; and
     a vibration suppressing portion that suppresses a vibration of the passage forming member, and
   the vibration suppressing portion has:
     a first elastic member that applies a load to the passage forming member in a direction in which an area of a cross section perpendicular to the direction of the central axis of the nozzle passage and the diffuser passage decreases; and
     a second elastic member that applies a load to the passage forming member in a direction opposite from the direction in which the first elastic member applies the load to the passage forming member.

2. The ejector according to claim 1, further comprising a restricting member that restricts a displacement of the passage forming member caused by the drive part in a direction of the central axis, wherein
   the restricting member has:
     a sliding shaft portion that extends in the direction of the central axis and is connected to the passage forming member; and
     a guide portion that is provided with a sliding hole in which the sliding shaft portion slides in the direction of the central axis.

3. The ejector according to claim 2, wherein
   the first elastic member and the second elastic member are disposed to apply the loads to the passage forming member respectively in directions to pull the sliding shaft portion against each other.

4. The ejector according to claim 1, wherein
   the drive part has a load adjusting member that adjusts the loads applied to the passage forming member by the vibration suppressing portion.

5. The ejector according to claim 1, wherein
   the drive part has a temperature sensing portion in which a temperature sensitive medium of which pressure varies in conjunction with temperature change is encapsulated,
   the pressure of the temperature sensitive medium changes when a temperature of the suction refrigerant is transferred to the temperature sensitive medium, and
   the pressure responsive member is displaced depending on the pressure of the temperature sensitive medium in the temperature sensing portion.

6. The ejector according to claim 5, wherein
   the temperature sensing portion and the pressure responsive member are formed in an annular shape to surround the central axis.

* * * * *